(12) United States Patent
Ikuta

(10) Patent No.: US 10,036,848 B2
(45) Date of Patent: Jul. 31, 2018

(54) LIGHTING DEVICE, DISPLAY DEVICE, AND TELEVISION DEVICE

(71) Applicant: Sharp Kabushiki Kaisha, Osaka-shi, Osaka (JP)

(72) Inventor: Jo Ikuta, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 686 days.

(21) Appl. No.: 14/419,317

(22) PCT Filed: Aug. 21, 2013

(86) PCT No.: PCT/JP2013/072279
§ 371 (c)(1),
(2) Date: Feb. 3, 2015

(87) PCT Pub. No.: WO2014/034487
PCT Pub. Date: Mar. 6, 2014

(65) Prior Publication Data
US 2015/0177453 A1    Jun. 25, 2015

(30) Foreign Application Priority Data

Aug. 28, 2012 (JP) ................................. 2012-187769

(51) Int. Cl.
*F21V 8/00* (2006.01)
*H04N 5/64* (2006.01)
(Continued)

(52) U.S. Cl.
CPC .......... *G02B 6/0091* (2013.01); *G02B 6/0068* (2013.01); *G02B 6/0073* (2013.01);
(Continued)

(58) Field of Classification Search
CPC .. G02B 6/0086; G02B 6/0088; G02B 6/0091; G02F 2001/133314
See application file for complete search history.

(56) References Cited

U.S. PATENT DOCUMENTS

| 4,236,847 A | * | 12/1980 | Yasuda ..................... A47G 1/10 |
| | | | 40/784 |
| 6,937,297 B2 | * | 8/2005 | Kang ................ G02F 1/133308 |
| | | | 349/58 |

(Continued)

FOREIGN PATENT DOCUMENTS

| JP | 2004-296193 A | 10/2004 | |
| JP | WO 2006134731 A1 | * 12/2006 | ....... G02F 1/133308 |

(Continued)

*Primary Examiner* — Alexander Garlen
*Assistant Examiner* — Colin Cattanach
(74) *Attorney, Agent, or Firm* — Keating & Bennett, LLP

(57) ABSTRACT

A backlight unit includes a light guide plate 16, LEDs 17, a chassis 14, a frame 13 and positioning members 30. The light guide plate 16 includes two edge surfaces that are light entrance surfaces 16*b* and a front surface that is a light exit surface. The LEDs 17 are arranged to be opposed to the light entrance surfaces 16*b* and in a portion of the light guide plate 16 except for four corner portions 16*d* of the light guide plate 16. The chassis 14 is arranged on an opposite side of the light guide plate 16 from the light exit surface. The frame 13 is arranged on a light exit surface side to have the light guide plate 16 and the LEDs 17 between the frame 13 and the chassis 14. The positioning members 30 are arranged on an inner surface of the frame 13 to be opposed to the respective four corner portions 16*d* of the light guide plate 16. Each of the positioning members 30 is in contact with an edge surface of the light guide plate 16 at each of the four corner portions 16*d* so as to position the light guide plate 16 in a plate surface direction. The positioning members are (Continued)

configured to slide to be away from the light guide plate 16 along the inner surface of the frame 13.

12 Claims, 21 Drawing Sheets

(51) Int. Cl.
    *G02F 1/1333* (2006.01)
    *H04N 5/66* (2006.01)

(52) U.S. Cl.
    CPC ..... *G02B 6/0088* (2013.01); *G02F 1/133308* (2013.01); *H04N 5/64* (2013.01); *G02F 2001/13332* (2013.01); *G02F 2001/133314* (2013.01); *G02F 2001/133322* (2013.01); *H04N 5/66* (2013.01)

(56) References Cited

U.S. PATENT DOCUMENTS

| | | | | |
|---|---|---|---|---|
| 7,665,878 | B2* | 2/2010 | Hsieh | G02F 1/133608 362/369 |
| 8,536,438 | B2* | 9/2013 | Goto | F16M 13/005 84/746 |
| 2001/0035921 | A1* | 11/2001 | Yamanami | G02F 1/133308 349/58 |
| 2002/0186526 | A1* | 12/2002 | Kim | G06F 1/1632 361/679.12 |
| 2004/0090560 | A1* | 5/2004 | Jang | G02F 1/133308 348/836 |
| 2006/0066768 | A1* | 3/2006 | Lee | G02F 1/133308 349/58 |
| 2008/0239197 | A1* | 10/2008 | Kasuga | G02F 1/133308 349/59 |
| 2010/0188599 | A1* | 7/2010 | Arihara | G02B 6/0055 349/60 |
| 2011/0128756 | A1* | 6/2011 | Cho | G02B 6/0068 362/606 |
| 2011/0170034 | A1* | 7/2011 | Jeong | G02B 6/0068 349/61 |
| 2011/0273631 | A1* | 11/2011 | Hayashi | G02B 6/0091 348/790 |
| 2013/0077319 | A1* | 3/2013 | Goto | F16M 13/005 362/296.01 |
| 2013/0077343 | A1* | 3/2013 | Kim | G02F 1/133608 362/602 |
| 2013/0215363 | A1* | 8/2013 | Zhang | G02B 6/0088 349/65 |
| 2013/0258704 | A1* | 10/2013 | Chen | G02B 6/0088 362/602 |
| 2013/0308074 | A1* | 11/2013 | Park | G02B 6/0088 349/58 |

FOREIGN PATENT DOCUMENTS

| | | | | |
|---|---|---|---|---|
| JP | WO 2010082377 | A1 * | 7/2010 | ........... G02B 6/0091 |
| JP | 4922475 | B1 * | 4/2012 | ........... F16M 13/005 |
| JP | WO 2012042798 | A1 * | 4/2012 | ....... G02F 1/133608 |
| JP | WO 2012093595 | A1 * | 7/2012 | ........... G02B 6/0091 |
| KR | 101079750 | B1 * | 11/2011 | ............. F21V 15/01 |

* cited by examiner

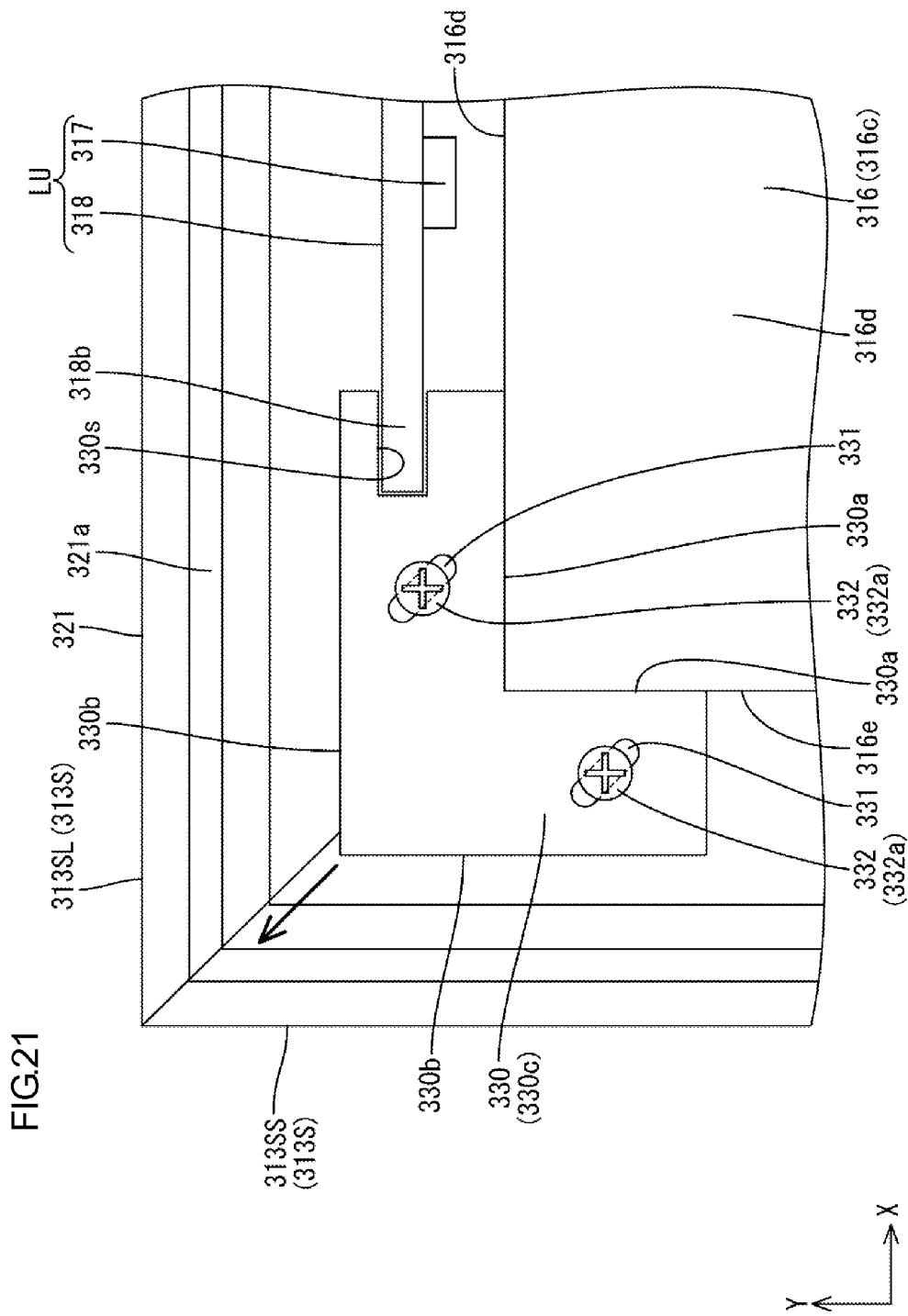

LIGHTING DEVICE, DISPLAY DEVICE, AND TELEVISION DEVICE

TECHNICAL FIELD

The present invention relates to a lighting device, a display device, and a television device.

BACKGROUND ART

In liquid crystal display devices such as liquid crystal television, for example, liquid crystal panels that are display panels do not emit light. Therefore, liquid crystal display devices require backlight devices as external lighting devices. The backlight devices are classified broadly into a direct type and an edge-light type based on mechanisms. For further reduction in thicknesses of the liquid crystal display devices, the edge-light type backlight devices are more preferable.

In an edge-light type backlight device, alight guide plate has a recess (or a projection), which is a cutout, on its edge surface and a casing has a projection (or a recess) in a part thereof and corresponding to the recess (the projection) of the light guide plate. It has been known that the light guide plate is positioned within the casing with respect to a plate surface of the casing by fitting the recess and the projection each other. Patent Document 1, for example, discloses a lighting device including such a configuration in which the light guide plate is positioned.

RELATED ART DOCUMENT

Patent Document

Patent Document 1: Japanese Unexamined Patent Publication No. 2004-296193

Problem to be Solved by the Invention

In the backlight device including such a configuration for positioning the light guide plate, a space is required between the recess and the projection because the light guide plate increases its size at the edge surfaces thereof due to thermal expansion. However, if the space is provided between the recess and the projection, light travelling within the light guide plate leaks through the space and the light is directed toward the display surface of the backlight device, and this may lower visibility on the display surface.

Reduction in a manufacturing cost or thickness of the display device has been recently requested and a cabinet that is an outer appearance part of liquid crystal display unit and made of synthetic resin may be omitted. However, if the above-described light guide plate positioning configuration is applied to a liquid display device without including the cabinet, the light leaking through the space between the recess and the projection may enter the liquid crystal panel through the edge surface thereof. In such a case, an excessive bright point (bright portion) may be caused on the display surface of the liquid crystal panel.

DISCLOSURE OF THE PRESENT INVENTION

The technology disclosed herein was made in view of the above circumstances. An object is to provide a configuration in which a light guide plate is positioned with respect to a plate surface thereof without including a recess or a projection on its edge surface even if thermal expansion is caused in the light guide plate.

Means for Solving the Problem

A lighting device according to the technology described in the specification includes a light guide plate including an edge surface as a light entrance surface and a plate surface as a light exit surface, a light source arranged to be opposed to the light entrance surface of the light guide plate and in a portion of the light guide plate except for four corner portions of the light guide plate, a chassis arranged on an opposite side of the light guide plate from the light exit surface, a frame arranged on a light exit surface side of the light guide plate to have the light guide plate and the light source between the frame and the chassis, and positioning members arranged on an inner surface of the frame to be opposed to the respective four corner portions of the light guide plate, each of the positioning members being in contact with an edge surface of the light guide plate at each of the four corner portions so as to position the light guide plate in a plate surface direction, the positioning members configured to slide away from the light guide plate along the inner surface of the frame.

According to the above lighting device, the light guide plate is arranged in the frame such that the four corner portions of the light guide plate are in contact with the respective positioning members during the manufacturing process. Accordingly, the light guide plate is positioned with respect to the frame in the plate surface direction thereof. No light source is arranged corresponding to the four corner portions of the light guide plate. Therefore, no positioning member is between the light source and the light entrance surface and light from the light source is not blocked by the poisoning member. The positioning members are effectively arranged and position the light guide plate in its plate surface direction without providing recesses or projections on the edge surface of the light guide plate. Further, each positioning member is configured to slide at least in a direction to move away from the light guide plate. Therefore, the positioning members move away from the light guide plate with the positioning member being in contact with the edge surfaces of the respective four corner portions of the light guide plate even if the light guide plate thermally expands and the edge surface thereof moves outwardly. According to the lighting device, even if the light guide plate thermally expands, the light guide plate is positioned in the plate surface direction thereof without including recesses or projections on the edge surface of the light guide plate.

Each positioning member may have a through hole that is therethrough in a thickness direction of the light guide plate and has a major axis along a direction to be away from the light guide plate. The lighting device may further include screw members each including a screw shaft portion and a screw head portion, and the screw shaft portion may have an outer diameter smaller than a short axis of the through hole and may be inserted through the through hole, and the screw head portion may have an outer diameter greater than the short axis of the through hole and sandwich the positioning member with the inner surface of the frame so that a distal end of the screw shaft portion being fixed to the inner surface of the frame.

According to such a configuration, the distal end of the screw shaft portion is tightened to the frame so that the screw member is fixed to the frame, and the positioning member held between the screw head portion and the distal end of the screw shaft portion can slide in the major axis direction of the through hole. The outer diameter of the screw head portion is smaller than a short axis of the through hole and therefore, the positioning member is not dropped off from a space between the screw head portion and the distal end of the screw shaft portion. Thus, the positioning means is configured to at least slide away from the light guide plate.

The frame may include frame pieces for each side thereof, and each of the positioning members may have a plan view L-shape and may be arranged to extend across end portions of adjacent two frame pieces to connect the two frame pieces.

According to such a configuration, the positioning member has a function of a connecting member that connects two adjacent frame pieces. Therefore, the connecting member is not required and the number of components is reduced.

The positioning members may be configured to slide toward a center of the light guide plate. The lighting device may further include elastic members arranged on an opposite side of the respective positioning members from the light guide plate to be in contact with the positioning members and fixed to the inner surface of the frame, and the elastic members may be softer than the positioning members.

According to such a configuration, when the light guide plate thermally expands, the elastic members elastically deform to absorb the size increase of the light guide plate. Thereafter, if the light guide plate shrinks due to a low temperature, the elastic members elastically recover so that each positioning member is pressed toward the center of the light guide plate with being in contact with the light guide plate. Therefore, the light guide plate is positioned by the positioning members even if the light guide plate shrinks. Thus, not only when the light guide plate thermally expands but also the light guide plate shrinks, the light guide plate is positioned.

The elastic members may be fixed to the inner surface of the frame with pressing the positioning members toward the light guide plate.

According to such a configuration, the positioning members are pressed toward the light guide plate by the elastic members, and even if the light guide plate shrinks without occurrence of thermal expansion, each positioning member is pressed toward the center of the light guide plate with being in contact with the light guide plate. Therefore, the light guide plate is positioned by the positioning members even if the light guide plate shrinks without occurrence of thermal expansion.

The lighting device may further include a light source board having a mount surface where the light source is mounted and extending along the light entrance surface with the mount surface being opposed to the light entrance surface. The light source board may be arranged on only one edge surface side of the light guide plate, and the light source board may have two end portions in an extending direction thereof and the mount surface of each of the two end portions may be in contact with an opposite surface of the positioning members from a surface that is in contact with the light guide plate.

According to such a configuration, the light source board is in contact with the positioning member so that a distance between the light source board and the light entrance surface of the light guide plate is determined. Thus, even if the light guide plate thermally expands and the positioning members slide outwardly of the light guide plate, the light source board is pressed to an outer side with respect to the light guide plate by the positioning members so that the light source board moves by the same distance as the movement distance of the light entrance surface. As a result, if the light guide plate thermally expands in the configuration that the light source is arranged corresponding to only one edge surface of the light guide plate, the distance between the light source and the light entrance surface of the light guide plate is maintained constant and optical properties are improved.

The positioning members that are in contact with the mount surface of the light source board may be configured to slide only in the extending direction of the light source board.

According to such a configuration, the positioning members that are in contact with the light source board slide away from the light guide plate in the extending direction of the light source board when the light guide plate thermally expands. The direction in which the light source board extends is perpendicular to a direction in which the light entrance surface moves toward the light source. Therefore, the light entrance surface does not move closer to the light source even if the positioning members that are in contact with the light source board slide in the extending direction of the light source board. Therefore, on the side including the light source, the movement of the edge surface of the light guide plate is absorbed and also the distance between the light source and the light entrance surface of the light guide plate is kept constant.

The lighting device may further include light source boards each having a mount surface where the light source is mounted and extending along the light entrance surface with the mount surface being opposed to the light entrance surface. The light source boards may be arranged corresponding to opposed edge surfaces of the light guide plate, respectively, and each of the light source boards may be held by the positioning members at two end portions of each light source board in the extending direction.

According to such a configuration, the two end portions of the light source board in the extending direction thereof are held by the respective positioning members to determine the distance between the light source board and the light entrance surface of the light guide plate. Even if the light guide plate thermally expands and the positioning members move away from the center of the light guide plate, the light source boards held by the respective positioning members move together with the positioning members and the light source boards also move by the same distance as the movement distance of the light entrance surface. In the configuration that the light source is arranged corresponding to the two opposed edge surfaces of the light guide plate, the distance between the light source and the light entrance surface of the light guide plate is constant even if the light guide plate thermally expands, and good optical properties are obtained.

The positioning members holding the light source board may each include a groove in a portion thereof opposed to one of the two end portions of the light source board in the extending direction, and the groove may be open toward the light source board and configured to hold a plate surface of the light source board. The light source board may be held by grooves at the two end portions thereof in the extending direction.

Accordingly, the light source board is held by the positioning members.

The technology described in the specification may be applied to a display device including a display panel configured to provide a display using light from the above lighting device. The display device may include a liquid crystal display panel including liquid crystals. The present technology may be applied to a television device including the above display device.

Advantageous Effect of the Invention

According to the technology described in this specification, a light guide plate is positioned in a plate surface direction thereof without including a recess or a projection in an edge surface thereof, even if the light guide plate thermally expands.

BRIEF DESCRIPTION OF THE DRAWINGS

FIG. 21 is a magnified plan view of one of four corner portions of the light guide plate 316 in FIG. 20.

MODE FOR CARRYING OUT THE INVENTION

First Embodiment

The first embodiment will be described with reference to the drawings. In the following description, a liquid crystal display device 10 will be described. An X-axis, a Y-axis, and a Z-axis are present in some drawings. The axes in each drawing correspond to the respective axes in other drawings. The X-axes and Y-axes correspond to the horizontal direction and the vertical direction, respectively. Without any special notes, the upper side and the lower side are referred to with respect to the vertical direction.

Figure 1:
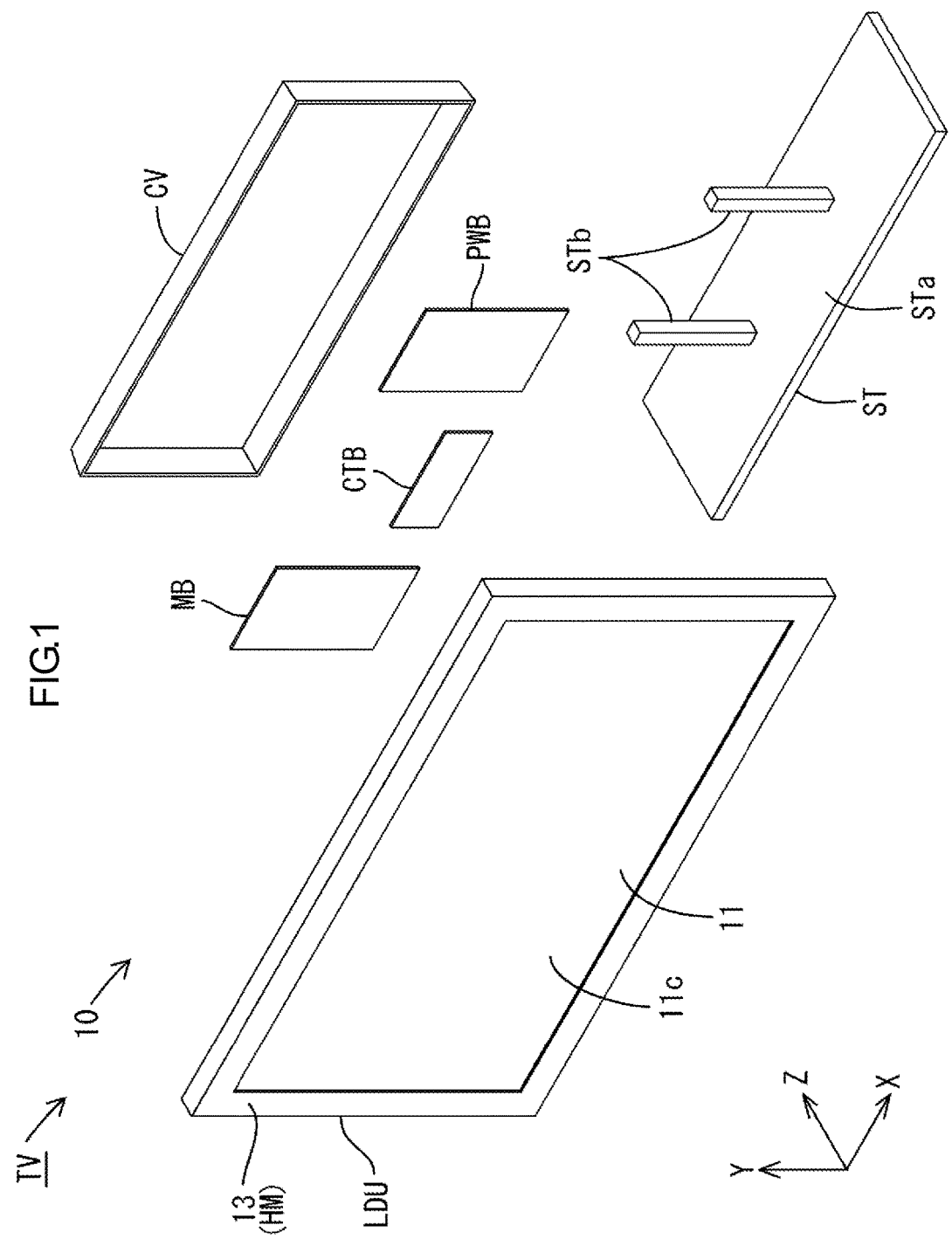
FIG. 1 is an exploded perspective view illustrating a general configuration of a television device TV and a liquid crystal display unit LDU according to a first embodiment.
Figure 2:
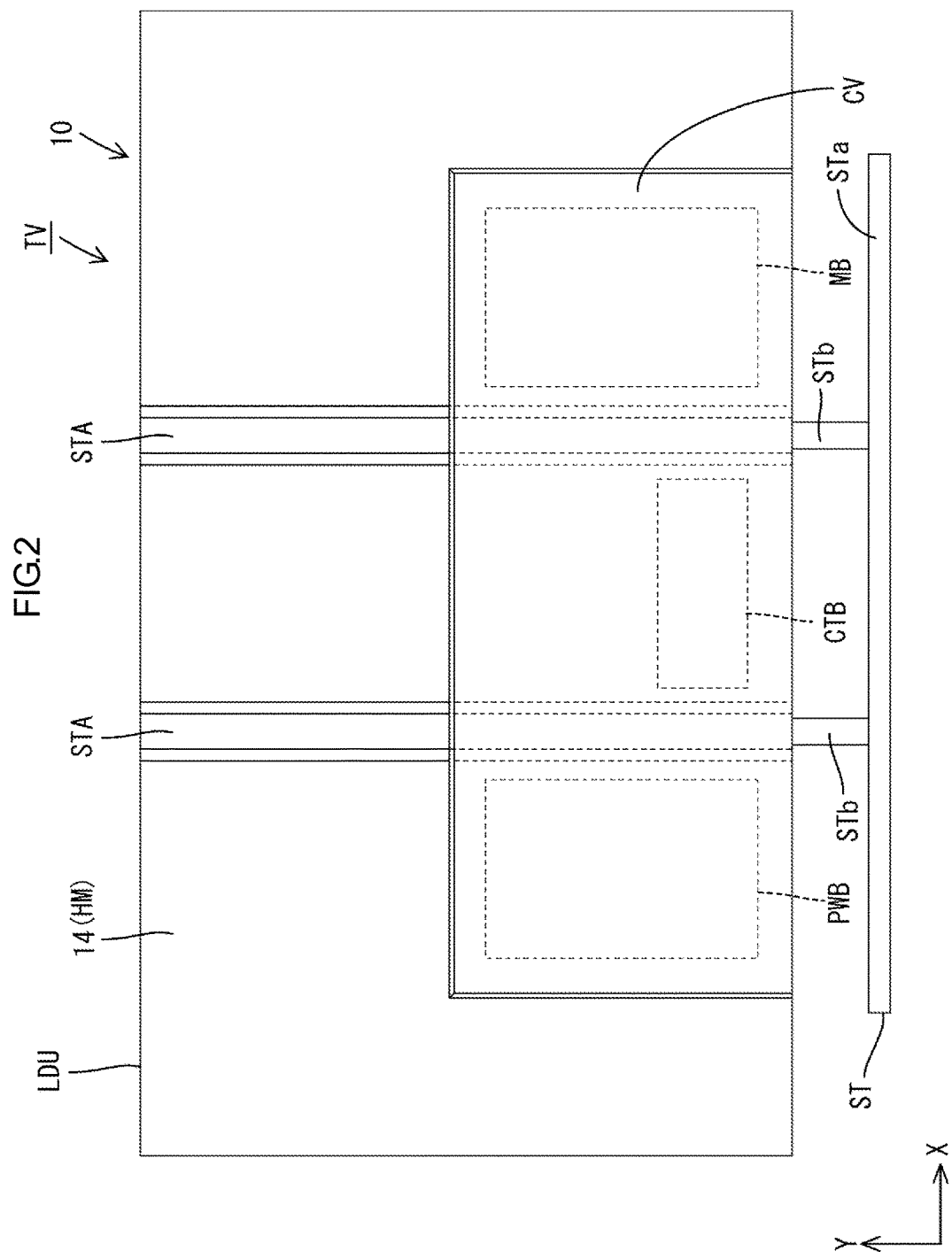
FIG. 2 is a rear view of the television device TV and a liquid crystal display device 10.

A television device TV includes a liquid crystal display unit LDU, boards PWB, MB, and CTB, a cover CV, and a stand ST. The boards PWB, MB, and CTB are attached on a rear surface (aback surface) of the liquid crystal display unit LDU. The cover CV is attached on a rear surface side of the liquid crystal display device 10 so as to cover the boards PWB, MB, and CTB. The stand ST supports the liquid crystal display unit LDU such that a display surface of the liquid crystal display unit LDU extends in the vertical direction (the Y-axis direction). The liquid crystal display device 10 according to this embodiment has the same configuration as the television device TV except for at least a component for receiving television signals (e.g. a tuner included in the main board MB). As illustrated in FIG. 2, the liquid crystal display unit LDU has a landscape rectangular shape (a rectangular shape, a longitudinal shape) as a whole. The liquid crystal display unit LDU includes a liquid crystal panel 11 as a display panel and a backlight unit 12 as an external light source. The liquid crystal display device 10 includes a frame 13 and a chassis 14 as exterior members that provide an appearance of the liquid crystal display device 10. The frame 13 and the chassis 14 hold integrally therewith the liquid crystal panel 11 and the backlight unit 12. According to this embodiment, the chassis 14 constitute apart of the exterior appearance and apart of the backlight device 12.

Configuration of the liquid crystal display device 10 on the rear surface side will be described. As illustrated in FIG. 2, two stand attachments STA are attached to a rear surface of the chassis 14. The rear surface of the chassis 14 provides a rear appearance of the liquid crystal display device 10. The stand attachments STA are away from each other in the X-axis direction and extend along the Y-axis direction on the chassis 14. Each stand attachment STA has a substantially channel-shaped cross section and is open to the chassis 14 so as to form a space with the chassis 14. Support portions STb of the stand ST are each inserted in the space between the respective stand attachments STA and the chassis 14. Traces (such as electric lines) that are connected to a LED board 18 included in the backlight unit 12 are passed through a space within the stand attachment STA. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand attachments STA in the X-axis direction. A component storage space is provided between the cover CV and the chassis 14 such that the boards PWB, MB, and CTB, which will be described next, are stored therein.

As illustrated in FIG. 2, the boards PWB, MB, and CTB include a power source board PWB, a main board MB, and a control board CTB. The power source board PWB is a power supply source of the liquid crystal display device 10 and thus supplies drive power to the other boards MB and CTB and to LEDs 17 of the backlight unit 12. In other words, the power source board PWB also serves as "an LED drive board that drives the LEDs 17". The main board MB includes at least a tuner and an image processor, which are not illustrated. The tuner is configured to receive television signals. The image processor performs image processing on the received television signals. The main board MB is configured to output the processed image signals to the control board CTB, which will be described later. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which are sent from the main board MB, to driving signals for liquid crystals and to supply the driving signals to the liquid crystal panel 11.

Figure 3:
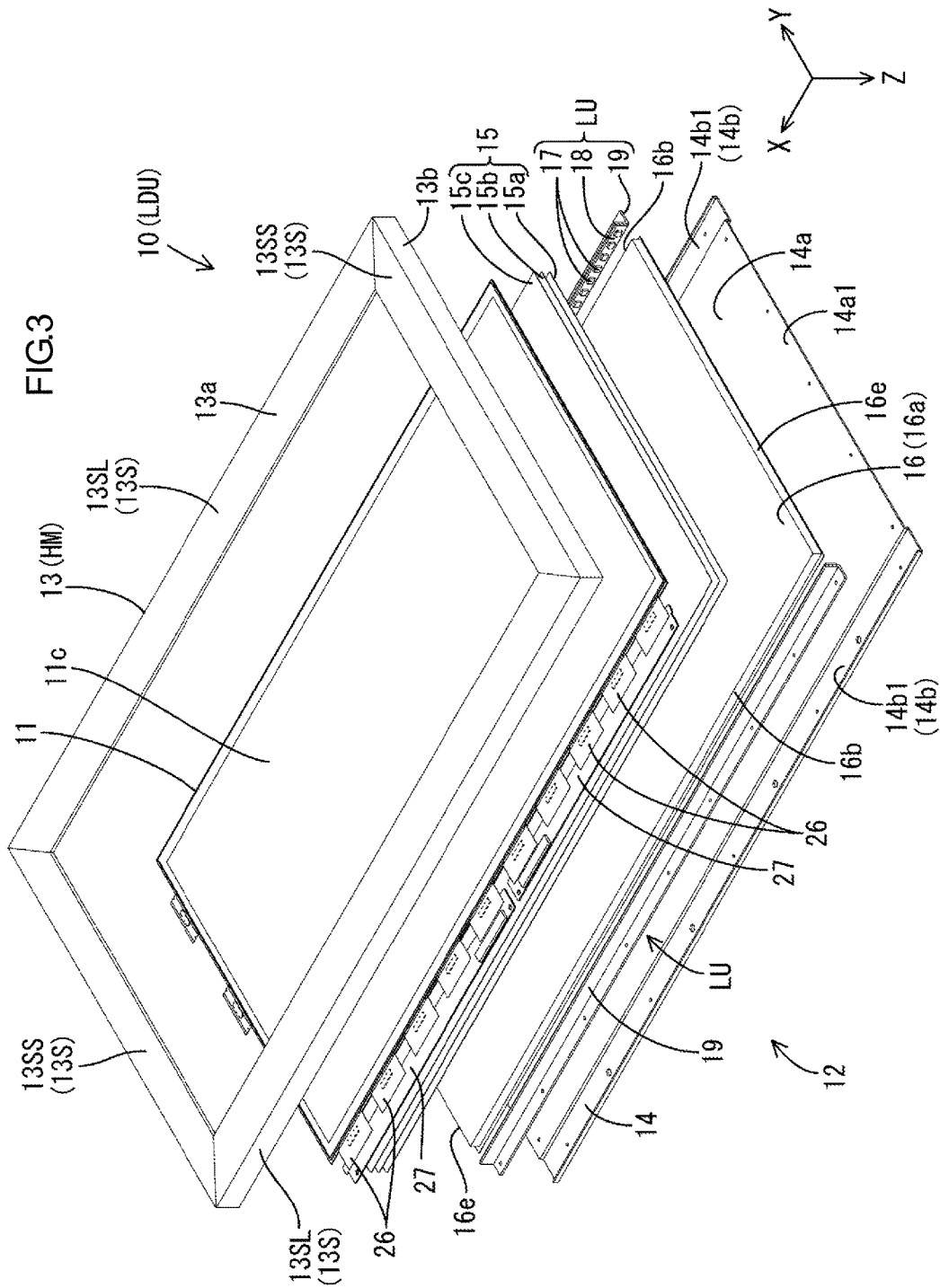
FIG. 3 is an exploded perspective view illustrating a general configuration of a liquid crystal display unit LDU included in the liquid crystal display device 10.

As illustrated in FIG. 3, components of the liquid crystal display unit LDU included in the liquid crystal display device 10 are arranged in a space between the frame 13, which provides a front appearance, and the chassis 14, which provides a rear appearance. The main components housed in the space between the frame 13 and the chassis 14 at least include the liquid crystal panel 11, an optical member 15, a light guide plate 16, and LED units LU. The liquid crystal panel 11, the optical member 15, and the light guide plate 16 are placed on top of one another and held between the frame 13 on the front side and the chassis 14 on the rear side. The backlight unit 12 includes the optical member 15, the light guide plate 16, the LED units LU, and the chassis 14. In other words, the liquid crystal display unit LDU without the liquid crystal panel 11 and the frame 13 is the backlight unit 12. The LED units LU of the backlight unit 12 are arranged in the space between the frame 13 and the chassis 14 so as to sandwich the light guide plate 16 from two sides with respect to the short-side direction thereof (Y-axis direction). The LED unit LU includes LEDs 17 as light sources, the LED board 18 on which the LEDs 17 are mounted, and a heat dissipation member (a heat spreader) 19 to which the LED board 18 is mounted. Each component will be described next.

As illustrated in FIG. 3, the liquid crystal panel 11 has a landscape rectangular shape (a rectangular shape, a longitudinal shape) in a plan view. The liquid crystal panel 11 includes a pair of glass substrates 11a and 11b (see FIG. 4) and liquid crystals. The substrates 11a and 11b each having high light transmission properties are bonded together with a predetermined gap therebetween. The liquid crystals are sealed between the substrates 11a and 11b. On one of the substrates (an array substrate 11b), switching elements (e.g. TFTs), pixel electrodes, and an alignment film are arranged. The switching elements are connected to gate lines and source lines that are arranged perpendicular to each other. The pixel electrodes are connected to the switching elements. On another one of the substrates (a CF substrate 11a), color filters, a counter electrode, and an alignment film are arranged. The color filters include red (R), green (G), and blue (B) color portions that are arranged in a predetermined arrangement. The liquid crystal panel 11 is placed on a front side of the optical member 15, which will be described later. A rear surface of the liquid crystal panel 11 (a rear surface of the polarizing plate) is fitted to the optical member 15 with minimal gaps therebetween. Therefore, dust is less likely to enter between the liquid crystal panel 11 and the optical member 15. The display surface 11c of the liquid crystal panel 11 includes a display area and a non-display area. The display area is an inner area of a screen in which images are displayed. The non-display area is an outer area of the screen around the display area and has a frame-like shape. The liquid crystal panel 11 is connected to the control board CTB via driver parts for driving liquid crystals or the flexible board 26. Images appear on the display area in the display surface 11c according to signals input from the control board CTB. Polarizing plates (not illustrated) are arranged on outer sides of the respective substrates 11a, 11b.

As illustrated in FIG. 3, the optical member 15 has a landscape rectangular shape in a plan view like the liquid crystal panel 11 and has about the same size (a short dimension and a long dimension) as the liquid crystal panel 11. The optical member 15 is placed on the front side (the light exit side) of the light guide plate 16, which will be described later, and sandwiched between the light guide plate 16 and the liquid crystal panel 11. The optical member 15 includes three sheets that are placed on top of one another. The optical member 15 includes a diffuser sheet 15a, a lens sheet (a prism sheet) 15b, and a reflecting type polarizing sheet 15c that are placed on top of one another from a rear side (a light guide plate 16 side). Each of the three sheets 15a, 15b, 15c has a substantially same plan view size.

Figure 4:
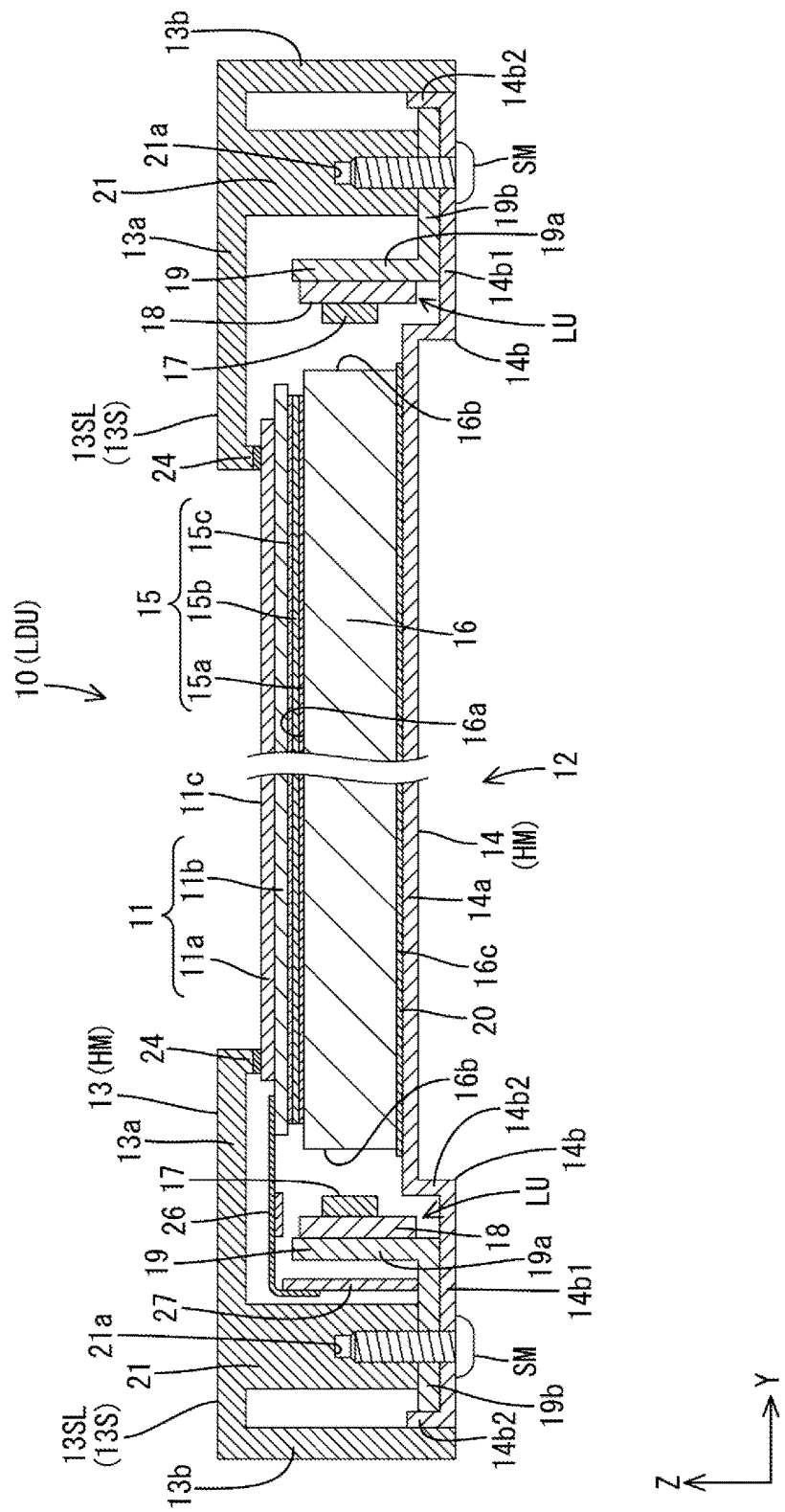
FIG. 4 is a cross-sectional view of the liquid crystal display device 10 taken in a short-side direction thereof.

The light guide plate 16 is made of a substantially transparent (high light transmissivity) synthetic resin (e.g. acrylic resin or polycarbonate such as PMMA) which has a refractive index considerably higher than that of the air. As illustrated in FIG. 3, the light guide plate 16 has a landscape rectangular shape in a plan view similar to the liquid crystal panel 11 and the optical member 15. A thickness of the light guide plate 16 is larger than a thickness of the optical member 15. A long-side direction and a short-side direction of a plate surface of the light guide plate 16 correspond to the X-axis direction and the Y-axis direction, respectively. A thickness direction of the light guide plate 16 that is perpendicular to the plate surface corresponds to the Z-axis direction. The light guide plate 16 is arranged on the rear side of the optical member 15 and sandwiched between the optical member 15 and the chassis 14. As illustrated in FIG. 4, at least a short dimension of the light guide plate 16 is greater than that of the liquid crystal panel 11 and the optical member 15. The two edge portions with respect to the short-side dimension are farther out than two edge portions of the liquid crystal panel 11 and the optical member 15 (so as not to overlap each other in a plan view. The light guide plate 16 is arranged to be sandwiched with respect to the Y-axis direction between a pair of LED units LU that are arranged on two ends in the short-side dimension, respectively. Light from the LEDs 17 enters the two edge portions with respect to the short-side dimension. The light from the LED 17 entering the light guide plate 16 through the two edge portions with respect to the short-side dimension travels within the light guide plate and is directed toward the optical member 15 side (the front side) and exits the light guide plate.

One of the plate surfaces of the light guide plate 16 facing the front is a light exit surface 16a (a surface facing the optical member 15). Light exits the light guide plate 16 through the light exit surface 16a toward the optical member 15 and the liquid crystal panel 11. Peripheral edge surfaces of the light guide plate 16 that are adjacent to the plate surfaces of the light guide plate 16 include long-side edge surfaces (peripheral edge surfaces with respect to the short-side direction) that extend in the X-axis direction. The long-side edge surfaces are opposed to the LEDs 17 (LED board 18) having a space therebetween and are a pair of light entrance surfaces 16b through which light from the LEDs 17 enters the light guide plate. As illustrated in FIG. 4, a reflection sheet 20 is arranged on a rear side of the light guide plate 16, that is, a plate surface 16c opposite from the light exit surface 16a (facing the chassis 14). The reflection sheet 20 is arranged to cover an entire area of the plate surface 16c.

The reflection sheet 20 is arranged between the chassis 14 and the light guide plate 16. The light exiting the light guide plate 17 toward a rear-outer side through the plate surface 16c is reflected by the reflection sheet 20 and directed frontward. The reflection sheet 20 is made of synthetic resin and has a white surface having high light reflectivity. The reflection sheet 20 has a short-side dimension larger than that of the light guide plate 16. The reflection sheet 20 is arranged such that two edge portions thereof protrude toward the LEDs 17 and are closer to the LEDs 17 than the respective light entrance surface 16b of the light guide plate 16. The protruded portion of the reflection sheet 20 effectively reflects light traveling obliquely from the LEDs 17 toward the chassis 14 so that the light is directed toward the light entrance surface 16b of the light guide plate 16.

Next, a configuration of each of the LEDs 17, the LED board 18, and the heat dissipation member 19, which are included in the LED unit LU, will be described. Each LED 17, which is included in the LED unit LU, includes an LED chip (not illustrated) that is sealed with resin on a board fixed on the LED board 18. The LED chip mounted on the board has one main light emission wavelength. Specifically, the LED chip that emits light in a single color of blue is used. On the other hand, the resin that seals the LED chip contains phosphors dispersed therein. The phosphors emit light in a predetermined color when excited by blue light emitted from the LED chip. Overall color of light emitted from the LED 17 is white. The phosphors may be selected, as appropriate, from yellow phosphors that emit yellow light, green phosphors that emit green light, and red phosphors that emit red light. The phosphors may be used alone or in combination of the above phosphors. The LED 17 includes a main light-emitting-surface 17a that is opposite to a surface on which the LED board 18 is mounted (a surface facing the light entrance surface 16b of the light guide plate 16). Namely, the LED 17 is a top-surface-emitting type LED (see FIG. 6 for the main light-emitting-surface 17a).

As illustrated in FIG. 3, each LED board 18 included in the LED unit LU has an elongated plate-like shape and extends in the long-side direction of the light guide plate 16 (the X-axis direction, the long-side direction of the light entrance surface 16b). The LED board 18 is placed in the space between the frame 13 and the chassis 14 such that a board surface of each LED board 18 is parallel to the X-Z plane, namely, parallel to the light entrance surface 16b of the light guide plate 16. The LED board 18 has a long-side dimension that is shorter than the long-side dimension of the light guide plate 16. Specifically, the LED board 18 is arranged to be opposed to the light entrance surface 16b of the light guide plate 16 except for four corner portions 16d of the light guide plate 16. The LEDs 17 having the above configuration are mounted on a plate surface of the LED board 18 that faces inward, namely, faces the light guide plate 16 (a surface opposed to the light guide plate 16) and the inner plate surface of the LED board 18 is a mount surface. The LEDs 17 are arranged in a line (i.e., linearly) at intervals on the mount surface of the LED board 18 along the longitudinal direction of the LED board 18 (the X-axis direction). In other words, multiple LEDs 17 are arranged apart from each other along the long-edge portions of the backlight unit 12. Distances between the adjacent LEDs 17 in the X-axis direction are substantially equal, that is, the LEDs 17 are arranged at substantially equal intervals. The direction in which the LEDs 17 are arranged matches the long-side direction of the LED board 18 (the X-axis direction). Traces (not illustrated) made of a metal film (such as copper foil) are formed on the mount surface of the LED board 18. Each trace extends in the X-axis direction crossing a group of LEDs 17 to connect the adjacent LEDs 17 in series and has terminals on the respective ends thereof. Each of the terminals is connected to the power source board PWB via a wiring member such as a connector or an electric wire to supply driving power to each LED 17.

As illustrated in FIGS. 3 and 4, the heat dissipation member 19 included in each LED unit LU is made of metal having high thermal conductivity, such as aluminum. The heat dissipation member 19 includes an LED mounting portion 19a and a heat dissipation portion 19b. The LED board 18 is mounted on the LED mounting portion 19a. The heat dissipation portion 19b is in surface-contact with a plate surface of the chassis 14. The LED mounting portion 19a and the heat dissipation portion 19b form an angle therebetween so as to have an L-like shape in a cross-section. The heat dissipation member 19 has a long-side dimension substantially equal to the long-side dimension of the LED board 18. The LED mounting portion 19a of the heat dissipation member 19 has a plate-like shape and is parallel to the plate surface of the LED board 18 and the light entrance surface 16b of the light guide plate 16. A long-side direction, a short-side direction, and a thickness direction of the LED mounting portion 19a correspond to the X-axis direction, the Z-axis direction, and the Y-axis direction, respectively. The LED board 18 is mounted on an inner surface of the LED mounting portion 19a, that is, a plate surface that faces the light guide plate 16. The LED mounting portion 19a has a long-side dimension that is substantially equal to that of the LED board 18, whereas a short-side dimension of the LED mounting portion 19a is larger than that of the LED board 18. Namely, ends of the LED mounting portion 19a in the short-side dimension are farther out than the ends of the LED board 18 in the Z-axis direction. The LED mounting portion 19a includes an outer plate surface opposite from the plate surface on which the LED board 18 is mounted. The outer plate surface of the LED mounting portion 19a is opposed to a screw mounting portion 21 included in a frame 13, which will be described later. The LED mounting portion 19a is arranged between the screw mounting portion 21 of the frame 13 and the light guide plate 16. The LED mounting portion 19a protrudes from an inner end of the heat dissipation portion 19b, which is an end of the heat dissipation portion 19b closer to the LEDs 17 (the light guide plate 16), in the Z-axis direction (a direction in which the liquid crystal panel 11, the optical member 15, and the light guide plate 16 overlap each other) toward the front side, that is, toward the frame 13.

As illustrated in FIGS. 3 and 4, the heat dissipation portion 19b has a plate-like shape and is parallel to the plate surface of the chassis 14. A long-side direction, a short-side direction, and a thickness direction of the heat dissipation portion 19b correspond to the X-axis direction, the Y-axis direction, and the Z-axis direction, respectively. The heat dissipation portion 19b protrudes from a rear end of the LED mounting portion 19a, which is an end of the LED mounting portion 19a closer to the chassis 14, in the Y-axis direction toward outside, which is a direction opposite from the light guide plate 16. The heat dissipation portion 19b has a long-side dimension substantially equal to the long-side dimension of the LED mounting portion 19a. An entire area of a rear plate surface of the heat dissipation portion 19b, which is a plate surface facing the chassis 14, is in contact with the plate surface of the chassis 14. A front plate surface of the heat dissipation portion 19b is a plate surface opposite from the surface of the heat dissipation portion 19b in contact with the chassis 14. The front surface of the heat dissipation portion 19b is opposed to the screw mounting portion 21 included in the frame 13 and in contact with a protruded surface of the screw mounting portion 21. The heat dissipation portion 19b is sandwiched between the screw mounting portion 21 of the frame 13 and the chassis 14. With this configuration, heat generated from the lighted LEDs 17 as they are turned on is transferred to the chassis 14 and the frame 13 including the screw mounting portions 21 via the LED board 18, the LED mounting portion 19a, and the heat dissipation portion 19b. Therefore, heat is effectively released to the outside of the liquid crystal display device 10 and heat is less likely to stay therein. The heat dissipation portion 19b includes through holes 19b1 in which respective screw members (a fixing member) SM are passed. The heat dissipation portion 19b is maintained to be mounted on the screw mounting portion 21 with a screw SM and has an insertion hole through which the screw SM is passed.

Next, configurations of the frame 13 and the chassis 14, which constitute the exterior member and the holding member HM, will be described. The frame 13 and the chassis 14 are made of metal such as aluminum so as to have high mechanical strength (rigidity) and high thermal conductivity compared to a frame and a chassis that are made of synthetic resin. As illustrated in FIG. 3, the frame 13 and the chassis 14 hold the liquid crystal panel 11, the optical member 15, and the light guide plate 16, which are placed on top of the other, from the front side and the rear side with the LED units LU that are arranged on each end in the short-side direction (the long-side ends) disposed in the space between the frame 13 and the chassis 14.

As illustrated in FIG. 3, the frame 13 has a landscape rectangular shape so as to surround the display area of the display surface 11c of the liquid crystal panel 11. The frame 13 includes a panel holding portion 13a and a side wall 13b. The panel holding portion 13a is parallel to the display surface 11c of the liquid crystal panel 11 and presses the liquid crystal panel 11 from the front. The side wall 13b protrudes from an outer portion of the panel holding portion 13a toward the rear. The panel holding portion 13a and the side wall 13b form an L-like shape in a cross-section. The panel holding portion 13a has a landscape-rectangular and frame-like shape that corresponds to an outer portion of the liquid crystal panel 11 (i.e., the non-display area, the frame-like portion). The panel holding portion 13a presses a substantially entire area of the outer portion of the liquid crystal panel 11 from the front side. The panel holding portion 13a has a width that is large enough to cover not only the outer portion of the liquid crystal panel 11 but also the outer portion of the optical member 15, the outer portion of the light guide plate 16, and the LED units LU from the front side. The outer portions of the optical member 15 and the light guide plate 16 and the LED units LU are located on the outer side with respect to the outer portion of the liquid crystal panel 11. Similar to the display surface 11c of the liquid crystal panel 11, a front exterior surface of the panel holding portion 13a (an opposed surface from the surface facing the liquid crystal panel 11) is seen from the front side of the liquid crystal display device 10. The panel holding portion 13a constitutes a front exterior of the liquid crystal display device 10 together with the display surface 11c of the liquid crystal panel 11. The side wall 13b has a substantially rectangular hollow shape and protrudes from the outer portion (specifically, the outer peripheral edge) of the panel holding portion 13a toward the rear side. The side wall 13b surrounds the liquid crystal panel 11, the optical member 15, the light guide plate 16, and the LED units LU, which are placed in the space between the frame 13 and the chassis 14. The side wall 13b surrounds an entire periphery of the chassis 14 on the rear side. An outer surface of the side wall 13b that extends along a peripheral surface of the liquid crystal display device 10 is seen from the outside of the liquid crystal display device 10. Therefore, the outer surface of the side wall 13b constitutes a top surface, a bottom surface, and side surfaces of the liquid crystal display device 10.

Figure 5:
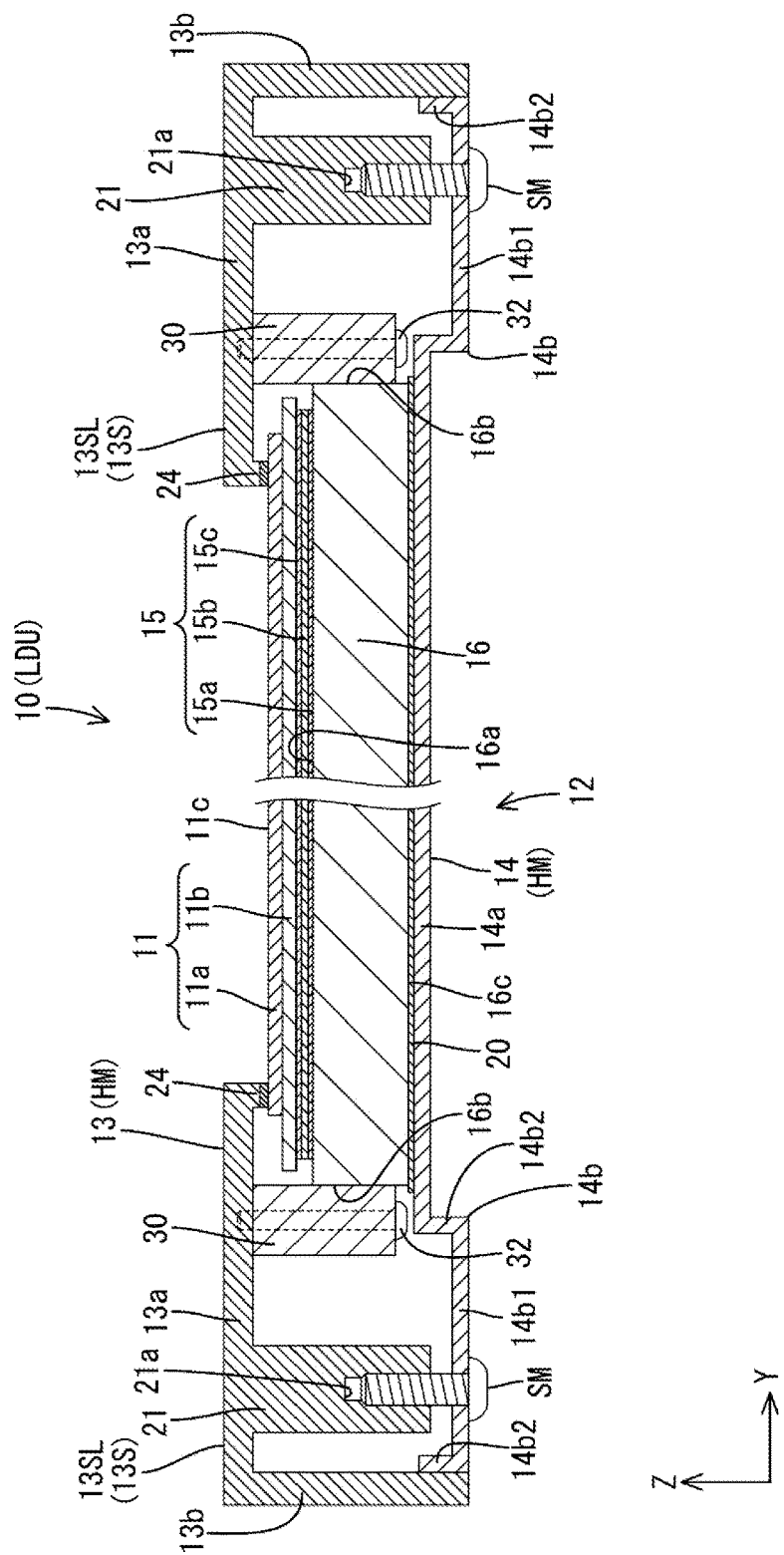
FIG. 5 is a cross-sectional view of the liquid crystal display device 10 taken in the short-side direction thereof along a line passing a positioning member 30.
Figure 6:
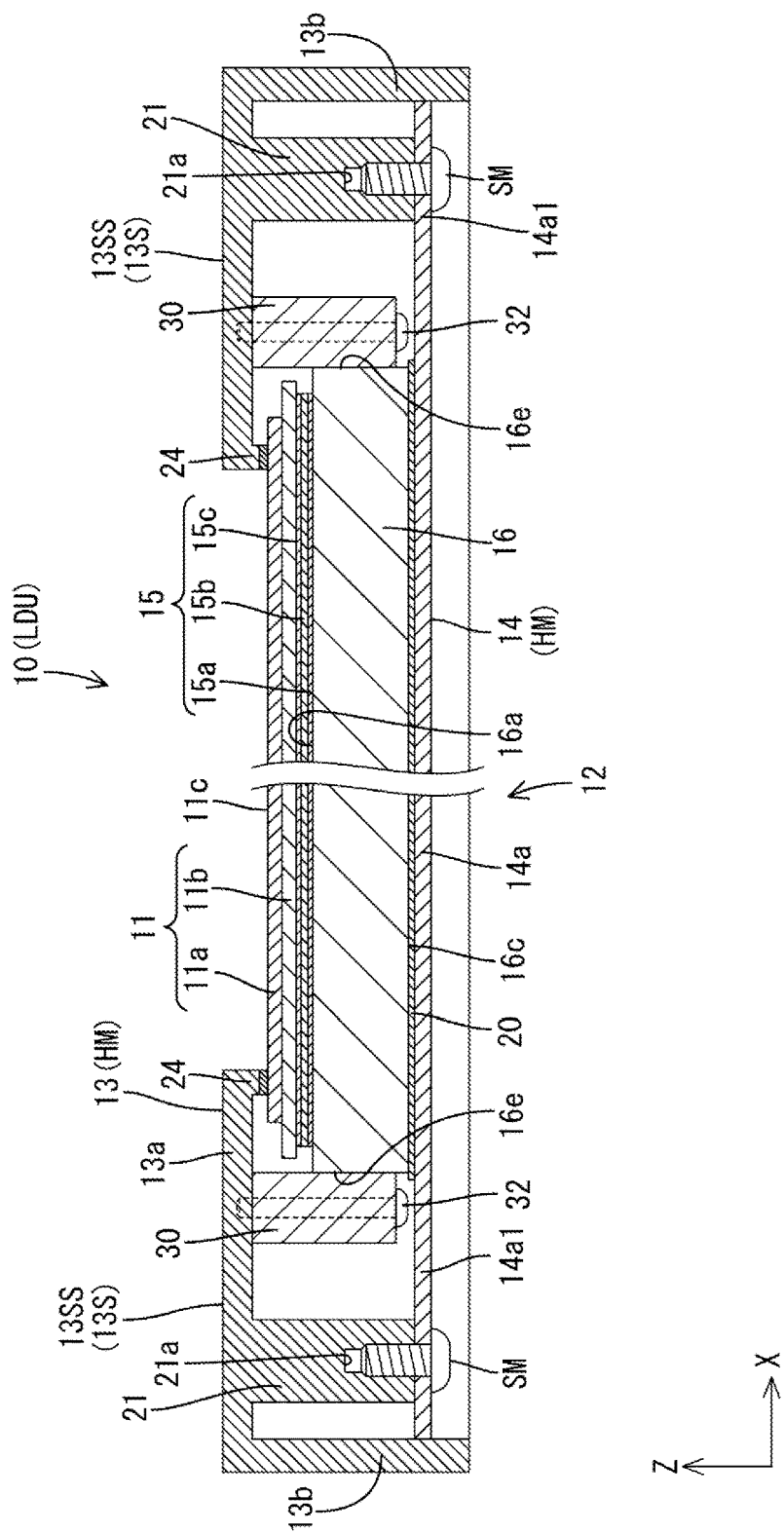
FIG. 6 is a cross-sectional view of the liquid crystal display device 10 taken in the long-side direction thereof along a line passing the positioning member 30.

As illustrated in FIGS. 4 to 6, the panel holding portion 13a integrally includes the screw mounting portions 21. Each screw mounting portion 21 is at a more interior position than the side wall 13b of the panel holding portion 13a (a position close to the light guide plate 16) and on an outer side with respect to a positioning rib 23, which will be described later. The screw members SM are mounted to the respective screw mounting portions 21. The screw mounting portion 21 protrudes from an inner surface of the panel holding portion 13a in the Z-axis direction toward the rear side and has a substantially longitudinal block shape extending along each side of the panel holding portion 13a (the X-axis direction or the Y-axis direction). As illustrated in FIG. 4, each screw mounting portion 21 includes a hole 21a that opens to the rear side so that the screw member SM is tightened therein. As illustrated in FIG. 4, the long-side screw mounting portions 21 are away from the corresponding LED mounting portion 19a with a predetermined distance. As illustrated in FIG. 4, a space is provided between one of the heat dissipation members 19 overlapping the flexible board 26 in a plan view and the screw mounting portion 21 to which the heat dissipation member 19 overlapping the flexible board 26 is mounted so that the printed board 27 is arranged in the space. Multiple flexible boards 26 are arranged on the printed board 27 at intervals along the long-side direction of the printed board 27. Another ends are connected to the printed board 27. The printed board 27 includes connector portions to which one end of the FPC is inserted and connected (the connector portions and FPC are not illustrated). Another end of the FPC is passed through insertion hole (not illustrated) formed in the chassis 14 and extends to a rear exterior side of the chassis 14 to be connected to the control board CTB.

As illustrated in FIG. 3, the chassis 14 has a substantially tray-like shape having a horizontally elongated shape as a whole and covers the entire areas of the light guide plate 16 and the LED units LU from the rear side. The chassis 14 has a rear surface (the surface opposite to the surface facing the light guide plate 16 and the LED unit LU) that is seen from the outside of the liquid crystal display device 10 and provides a rear surface of the liquid crystal display device 10. The chassis 14 includes a bottom plate portion 14a and two LED holding portions 14b. The bottom plate portion 14a has a horizontally elongated rectangular shape similar to the light guide plate 16. The LED holding portions 14b protrudes from respective two long-side portion of the bottom plate portion 14a toward the rear side in a step-like shape. The LED units LU are arranged in the respective LED holding portions 14b.

As illustrated in FIGS. 3 and 4, the bottom plate portion 14a has a flat plate shape to receive a most middle portion of the light guide plate 16 in the short-side direction (except for edge portions in the short-side direction). The bottom plate portion 14a receives the portion of the light guide plate 16 from the rear side and is configured as a receiving portion for receiving the light guide plate 16. As illustrated in FIGS. 5 and 6, the edge portions of the bottom plate portion 14a with respect to the long-side direction are on outer side from the edge portions of the light guide plate 16 with respect to the long-side direction.

As illustrated in FIGS. 3 and 4, the LED holding portions 14b are arranged to sandwich the bottom plate portion 14a therebetween from two sides with respect to the short-side direction of the bottom plate portion 14a. The LED holding portion 14b is recessed from the bottom plate portion 14a toward the rear side to provide a space for holding the LED units LU therein. The LED holding portion 14b includes a screw fitting portion 14b1 and sidewalls 14b2. The screw fitting portion 14b1 is parallel to the bottom plate portion 14a and the screw member SM is attached thereto from an outer side. The sidewalls 14b2 stand up from the respective two end portions of the screw fitting portion 14b1 toward the front side. An inner one of the two sidewalls 14b2 is continuous to the bottom plate portion 14a. On the screw fitting portion 14b1 included in the LED holding portion 14b, the heat dissipation portion 19b of the heat dissipation member 19, which is included in the LED unit LU, is disposed such that a surface of the heat dissipation portion 19b is in contact with the inner surface of the screw fitting portion 14b1. The outer sidewalls 14b2 included in the LED holding portions 14b have outer surfaces that are in contact with the respective inner surfaces of the sidewalls 13b. Accordingly, the chassis 14 is positioned with respect to the frame 13 in the Y-axis direction.

Figure 8:
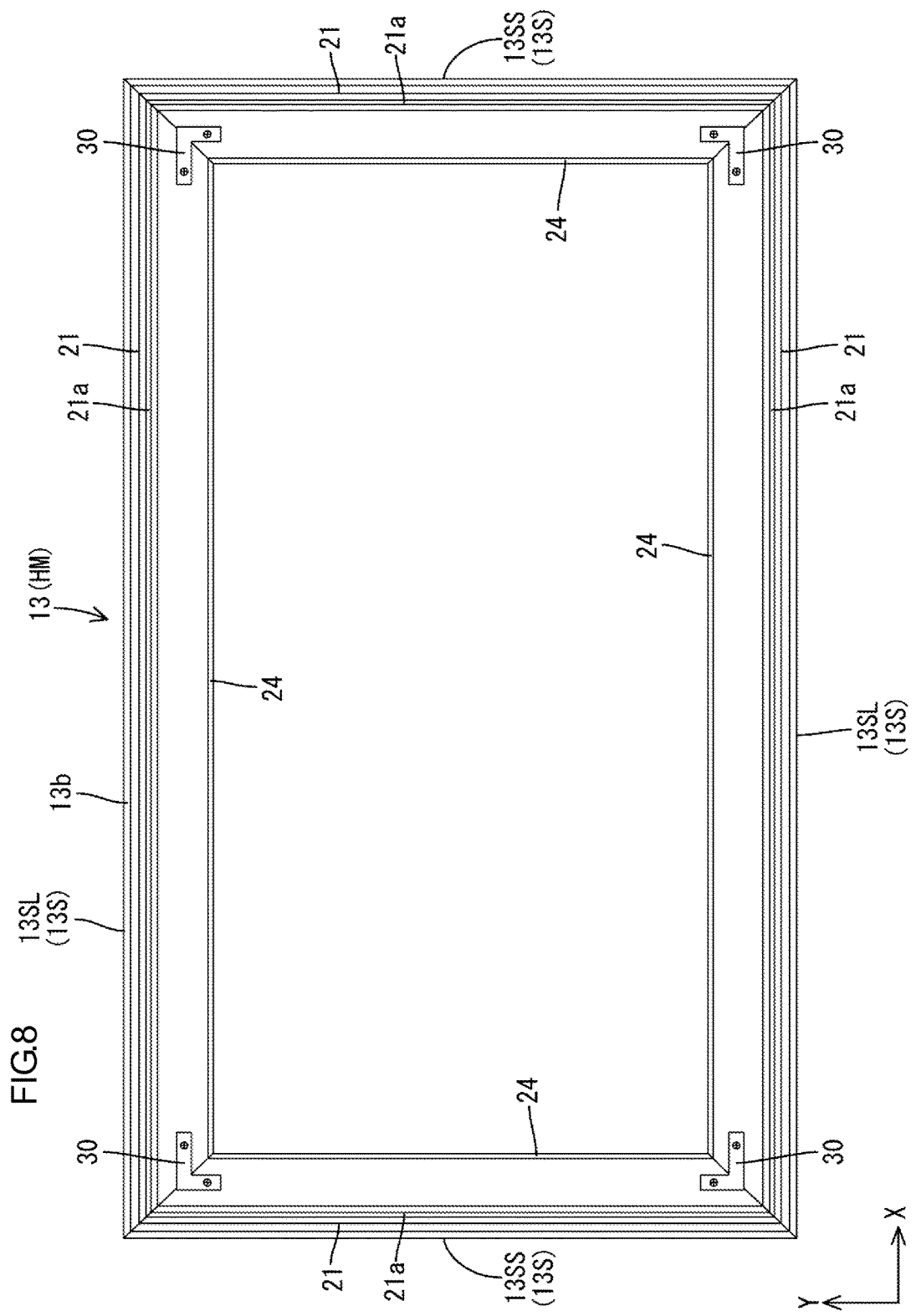
FIG. 8 is a plan view of a frame 13 including the positioning members 30 seen from a rear side.

Next, according to the present embodiment, connection of frame pieces 13S, an arrangement and a configuration of positioning members 30 included in the frame 13, and operations in case of thermal expansion of the light guide plate 16 will be described. As illustrated in FIG. 8, the frame 13 formed in a frame-like shape with the above configuration includes four frame pieces 13S that are assembled together. The frame pieces 13S (long-side portions and short-side portions) each correspond to each side of the frame 13. Specifically, the frame pieces 13S include long-side frame pieces 13SL and short-side frame pieces 13SS that constitute the long-side portions and the short-side portions of the frame 13 (the panel holding portions 13a and the side walls 13b), respectively. Every adjacent two of the four frame pieces 13S (the long-side frame piece 13SL and the short-side frame piece 13SS) are connected to each other with the positioning member 30 to form a frame-like shape as a whole. Therefore, four positioning members 30 are arranged on a rear side of the frame 13 and are arranged on respective four corner portions of the frame 13 having the frame-like shape.

Figure 10:
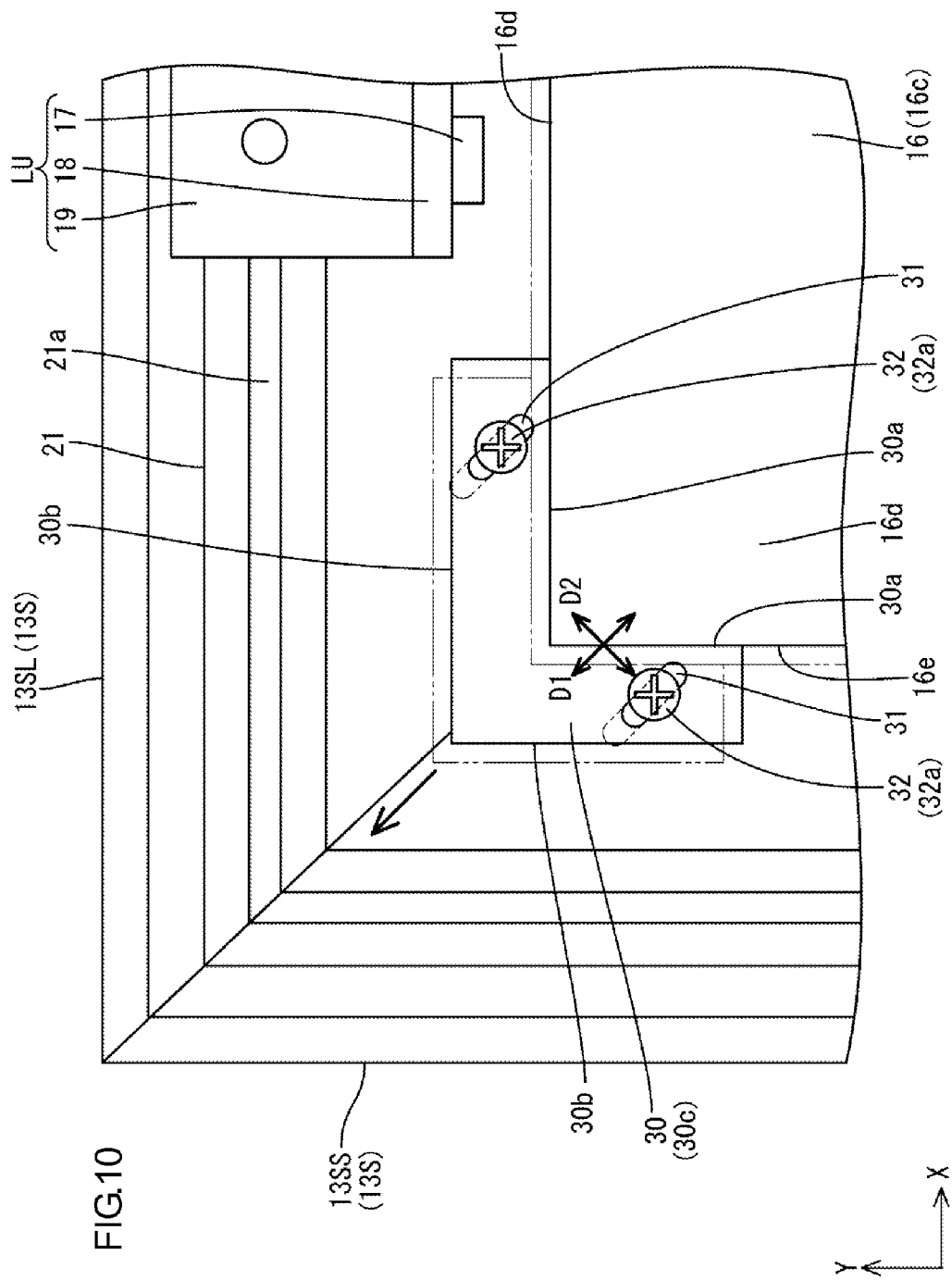
FIG. 10 is a magnified plan view of one of four corners of the light guide plate 16 in FIG. 9.
Figure 11:
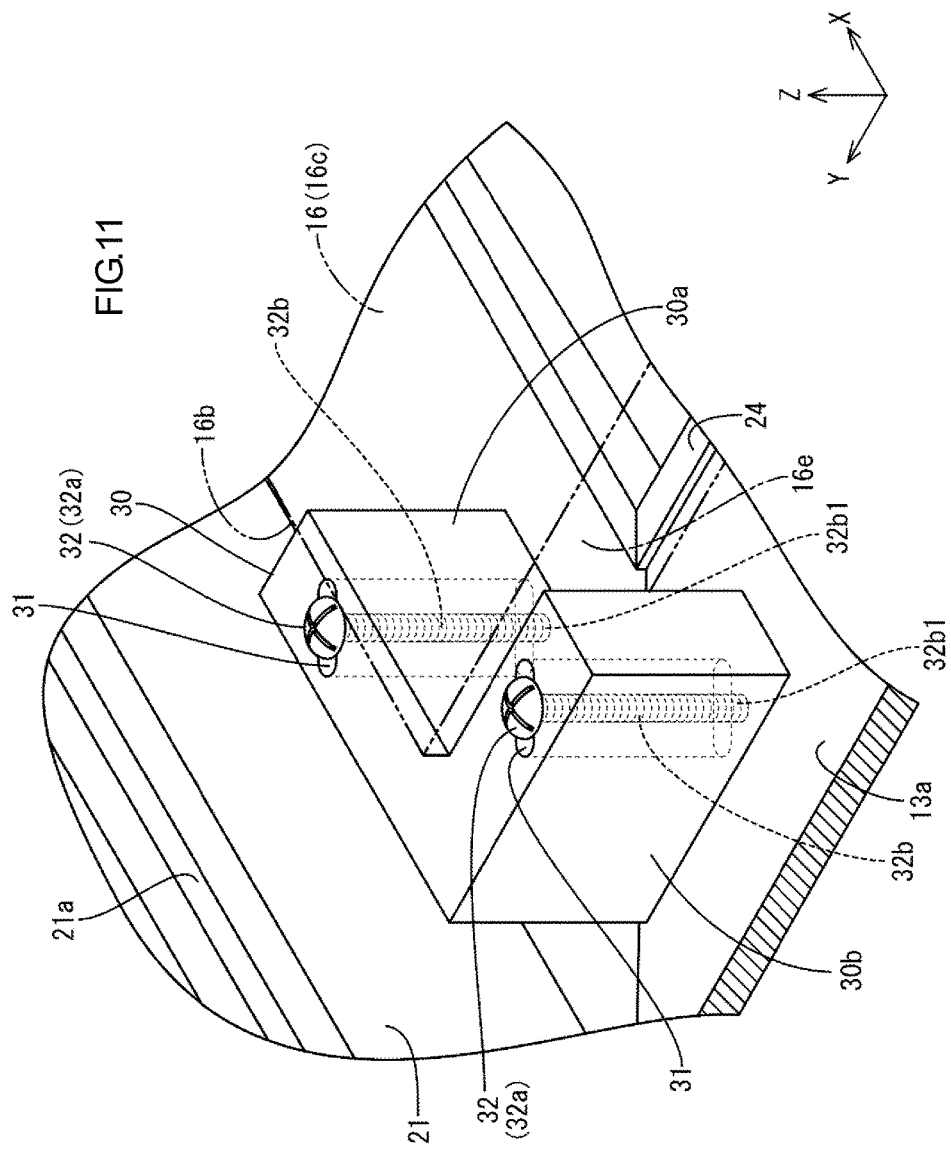
FIG. 11 is a perspective view of FIG. 10 seen from an obliquely upper side.

As illustrated in FIGS. 10 and 11, each of the positioning members 30 has two through holes 31 that are through a thickness of the positioning members 30 (in the Z-axis direction). One of the two through holes 31 in each positioning member 30 is formed to overlap the long-side frame piece 13SL in a plan view and another one of the two through holes 31 is formed to overlap the short-side frame piece 13SS in a plan view. A mounting screw (a screw member) 32 is inserted through each of the two through holes 31 and a distal end of each mounting screw 32 is tightened to the long-side frame piece 13SL and the short-side frame piece 13SS, respectively. Accordingly, the positioning members 30 are mounted on the frame 13. Specifically, the mounting screw 32 includes a screw head portion 32a and a screw shaft portion 32b. The screw shaft portion 32b of the mounting screw 32 is passed through each through hole 31 and a distal end 32b1 of the screw shaft portion 32b is screwed into the rear surface of the panel holding portion 13a of the frame 13. Accordingly, each positioning member 30 is sandwiched between the screw head portion 32a and the panel holding portion 13a of the frame 13 to be held therebetween. Thus, the positioning member 30 extends across the adjacent two frame pieces 13S so that the adjacent two frame pieces 13S are connected to each other by the positioning member 30.

Figure 9:
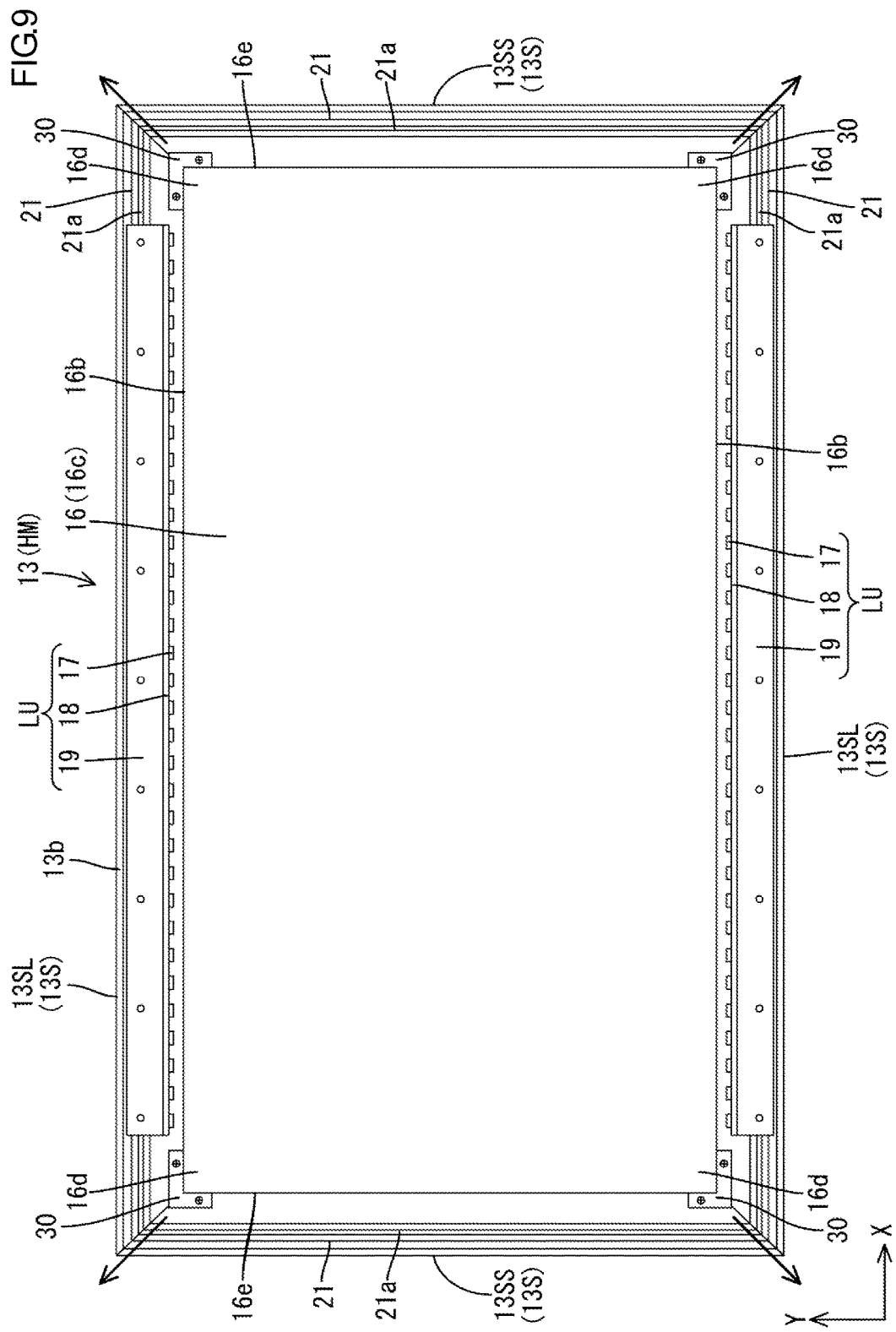
FIG. 9 is a rear view of the frame 13 including the positioning members 30, a light guide plate 16, and a LED unit LU.

As illustrated in FIGS. 8 and 9, the positioning members 30 are arranged to be opposed to corresponding four corner portions 16d of the light guide plate 16 and position the light guide plate 16 with respect to a plate surface (the X-Y plane). Each positioning member 30 is arranged such that the inner surface 30a thereof faces each corner portion 16d of the light guide plate 16 and the outer surface 30b thereof is opposed to the screw mounting portion 21 included in the frame 13. Each positioning member 30 has a substantially plan-view L shape and is bent along an edge surface of corresponding one of the four corner portions 16d of the light guide plate 16. The inner surface 30a of each positioning member 30 is in contact with the edge surface of the corresponding one of the four corner portions 16d of the light guide plate 16 (refer to FIGS. 7 and 10). Each positioning member 30 has a substantially plan-view L shape, as described before, and therefore, the inner surface 30c of each positioning member 30 is in contact with a long-side edge surface (the light entrance surface) 16b and a short-side edge surface 16e of the light guide plate 16 at the corresponding one of the four corner portions 16d of the light guide plate 16. Because each positioning member 30 mounted on the frame 13 is in contact with the edge surface of the corresponding one of the four corner portions 16d of the light guide plate 16 as described before, the light guide plate 16 is less likely to move in the long-side direction of the light guide plate 16 (the X-axis direction) and in the short-side direction of the light guide plate (the Y-axis direction). Therefore, the light guide plate 16 is effectively positioned in the plate surface direction (the X-Y plane direction) with respect to the frame 13.

Figure 7:
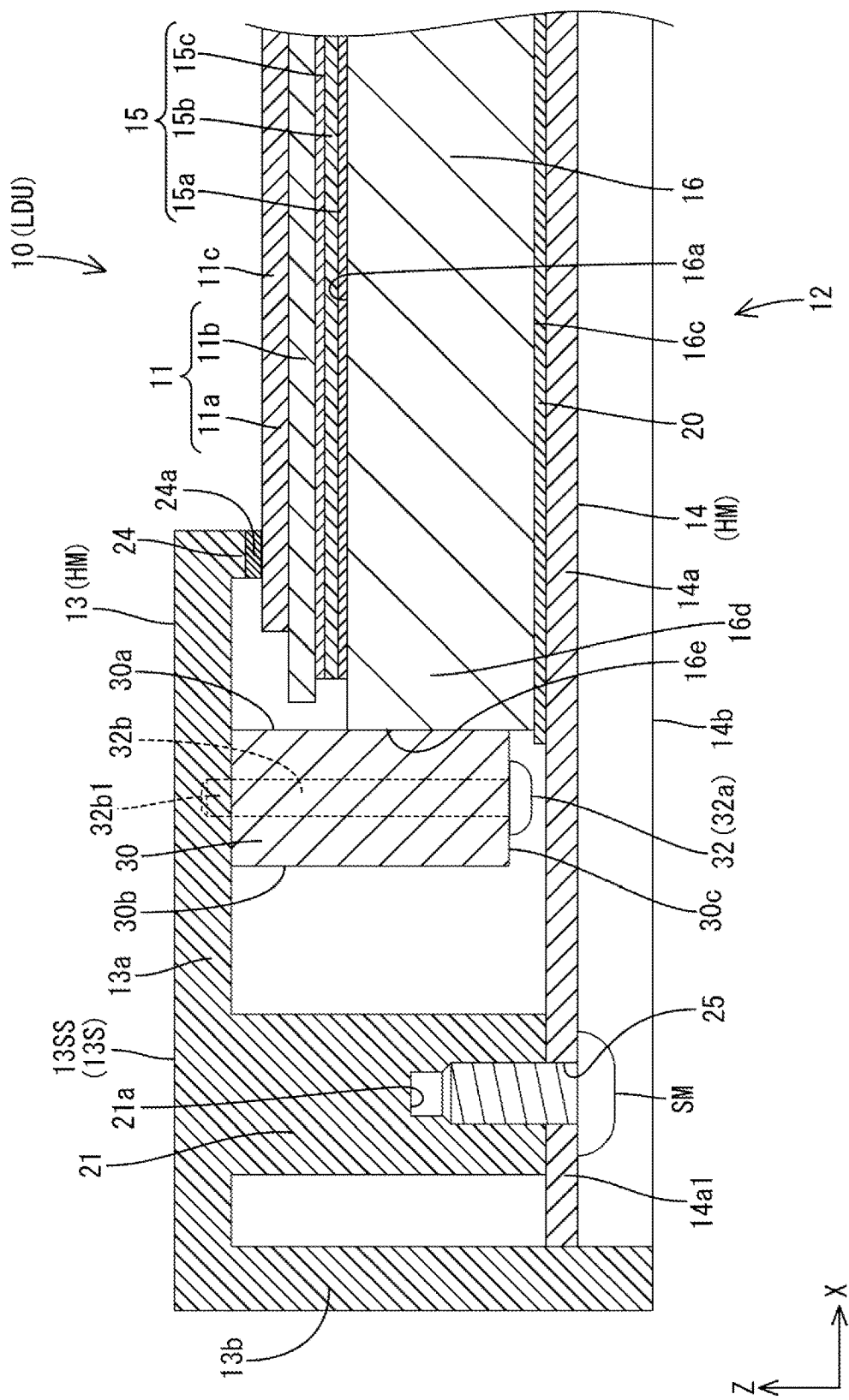
FIG. 7 is a magnified cross-sectional view of a part of the liquid crystal display device near the positioning member 30.

As illustrated in FIG. 10, the through holes 31 in each positioning member 30 have an ellipsoidal plan view shape having a major axis in a direction such that the positioning member 30 moves away from the light guide plate 16. Specifically, if the light guide plate 16 thermally expands, the edge surface of the light guide plate 16 in contact with the positioning member 30 having the through holes 31 moves in a direction (represented by an arrow in FIGS. 9 and 10) that is a major axis direction D1 of the through holes 31. A direction perpendicular to the major axis direction D1 and parallel to the plate surface direction of the light guide plate 16 (an X-Y plane) is a short-axis direction D2 of the through holes 31 (refer to FIG. 10). Each positioning member 30 can slide by a distance of a major axis length of the ellipsoidal through hole 31 because of the ellipsoidal shape of each through hole 31. Each screw head portion 32a has a diameter greater than a short-side direction D2 width of the through hole 31 and the positioning members 30 are held between the frame 13 and the respective screw head portions 32a. Therefore, the positioning members 30 are less likely to be removed from the mounting screws 32. As illustrated in FIG. 7, the bottom surfaces 30c of the positioning members 30 are located closer to the front side than the opposite surface 16c of the light guide plate 16 is. Therefore, the screw head portions 32a of the mounting screws 32 are not contact with the bottom plate portion 14a of the chassis 14.

According to the present embodiment, in a manufacturing process of the liquid crystal display device 10, the components are assembled sequentially from a front-surface side (an upper side in FIG. 4) of the liquid crystal display device to manufacture the liquid crystal display devices 10. Specifically, the frame pieces 13S are connected together to form the frame 13 and then, the light guide plate 16 that is positioned by the positioning members 30 mounted on the frame 13 is mounted in the frame 13. Thereafter, the LED units LU are mounted and the chassis 14 is mounted on the frame 13 lastly. Namely, each of the frame pieces 13S included in the frame 13 is placed with its rear-side surface facing upward and the positioning members 30 are fixed to the frame pieces 13S with screws such that each positioning member 30 is arranged over a border portion of the frame pieces 13S. Accordingly, the frame 13 having a frame shape and including the positioning members 30 mounted on the four corner portions thereof is formed. Next, the light guide plate 16 is placed such that the edge surfaces of the four corner portions 16d are in contact with the inner surfaces 30a of the positioning members 30, respectively. Accordingly, the light guide plate 16 is positioned with respect to the frame 13 and arranged in the frame 13. Next, the LED units LU are mounted on the frame 13 with screws. Then, the chassis 14 is mounted on the frame and the screw members SM are tightened from the rear side of the chassis 14 so that the chassis 14 is mounted to the frame 13. Accordingly, the manufacturing process of the liquid crystal display device 10 is completed.

If the light guide plate 16 that is positioned with respect to the frame 13 thermally expands, the edge surfaces of the four corner portions 16d of the light guide plate 16 move to be away from a center of the light guide plate 16 as represented by arrows in FIGS. 9 and 10. Chain double-dashed lines in FIG. 10 represent a position of an edge surface of one of the four corner portions 16d of the light guide plate 16 and a position of the positioning member 30 when the light guide plate 16 thermally expands. As described before, the major-axis direction D1 of the through holes 31 in the positioning member 30 is parallel to the direction in which the edge surface of the corner portion 16d of the light guide plate 16 moves when the light guide plate 16 thermally expands. Therefore, the inner surface 30a of the positioning member 30 is pressed by the edge surface according to the movement of the edge surface of the light guide plate 16 and the positioning member 30 moves along the major-axis direction D1 of the through holes 31 when the light guide plate 16 thermally expands. Namely, as represented by the chain double-dashed lines in FIG. 10, the positioning member 30 moves to be away from the light guide plate 16 (in a direction in which the edge surface of the light guide plate 16 moves) according to the movement of the edge surface of the corner portion 16d of the light guide plate 16 when the light guide plate 16 thermally expands. Accordingly, even if the light guide plate 16 thermally expands, the positioning members 30 are maintained to be in contact with the light guide plate 16 and absorb the size increase of the light guide plate 16 caused by the thermal expansion and ensure the functions of positioning the light guide plate 16.

The light guide plate 10 moves downwardly due to its own weight, when the backlight unit 12 according to the present embodiment is arranged in the vertical position used as a television device TV. Therefore, in the vertical position of the liquid crystal display device 10, even if the light guide plate 16 thermally shrinks, the light guide plate 16 thermally shrinks with applying the weight of the light guide plate 16 to the two positioning members 30 arranged on a lower side thereof. Therefore, the light guide plate 16 and the two positioning members 30 arranged on the lower side of the light guide plate 16 are kept to be in contact with each other. Accordingly, the light guide plate 16 is positioned by the two positioning members 30 arranged on the lower side of the light guide plate 16 even if the light guide plate 16 thermally shrinks.

As described before, according to the backlight unit 12 of the present embodiment, the light guide plate 16 is arranged in the frame 13 such that the four corner portions 16d of the light guide plate 16 are in contact with the respective positioning members 30 during the manufacturing process. Accordingly, the light guide plate 16 is positioned with respect to the frame 13 in the plate surface direction thereof (along the X-Y plane). No LED 17 is arranged corresponding to the four corner portions 16d of the light guide plate 16. Therefore, no positioning member 30 is between the LEDs 17 and the light entrance surface 16b and light from the LEDs 17 is not blocked by the poisoning member 30. The positioning members 30 are effectively arranged and position the light guide plate 16 in its plate surface direction (the X-Y plane direction) without providing recesses or projections on the edge surface of the light guide plate 16. Further, each positioning member 30 is configured to slide at least in a direction to move away from the light guide plate 16 (in the major-axis direction of the through hole 31). Therefore, the positioning members 30 move away from the light guide plate 16 with the inner surfaces 30 thereof being in contact with the edge surfaces of the respective four corner portions 16d of the light guide plate 16 even if the light guide plate 16 thermally expands and the edge surface thereof moves outwardly. According to the above-described backlight unit 12, even if the light guide plate 16 thermally expands, the light guide plate 16 is positioned in the plate surface direction thereof (along the X-Y plane) without including recesses or projections on the edge surface of the light guide plate 16.

In the backlight unit 12 according to the present embodiment, the frame 13 is constituted by the frame pieces 13S that correspond to the respective sides of the frame 13. Each of the four positioning members 30 has a plan view L-shape and is arranged across edge portions of two adjacent frame pieces 13S to connect the two frame pieces 13S. Namely, the positioning members 30 have functions as a connecting member that connects the frame pieces 13S. Thus, the positioning members 30 have the functions as the connecting members that connect the respective adjacent two frame pieces 13, and therefore, connecting members are not required and this reduces the number of components.

In the backlight unit 12 according to the present embodiment, the mounting screws 32 are tightened firmly so that the bottom surface 30c of the positioning member 30 is pressed firmly by the screw head portions 32a. Accordingly, the positioning members 30 are less likely to move. The mounting screws 32 are loosened so that the screw head portions 32a are away from the bottom surface 30c of the positioning member 30 and accordingly, the positioning members 30 are likely to move. Thus, mobility of the positioning members 30 is adjusted by changing the tightening degree of the mounting screws 32. Therefore, the mobility of the positioning members 30 is adjusted according to a degree of movement of the four corner portions 16d of the light guide plate 16 due to the thermal expansion or a degree of stress applied to the positioning members 30.

The television device TV according to the present embodiment does not include a cabinet. Since the light guide plate 16 does not include any recesses or projections on its edge surfaces, light is less likely to leak through the edge surfaces of the light guide plate 16 and light is less likely to enter the liquid crystal panel 11 through the edge surfaces thereof. Therefore, a bright point is less likely to be generated on the display surface 11c of the liquid crystal panel 11 due to the light incident on the edge surface of the liquid crystal panel 11.

Second Embodiment

Figure 12:
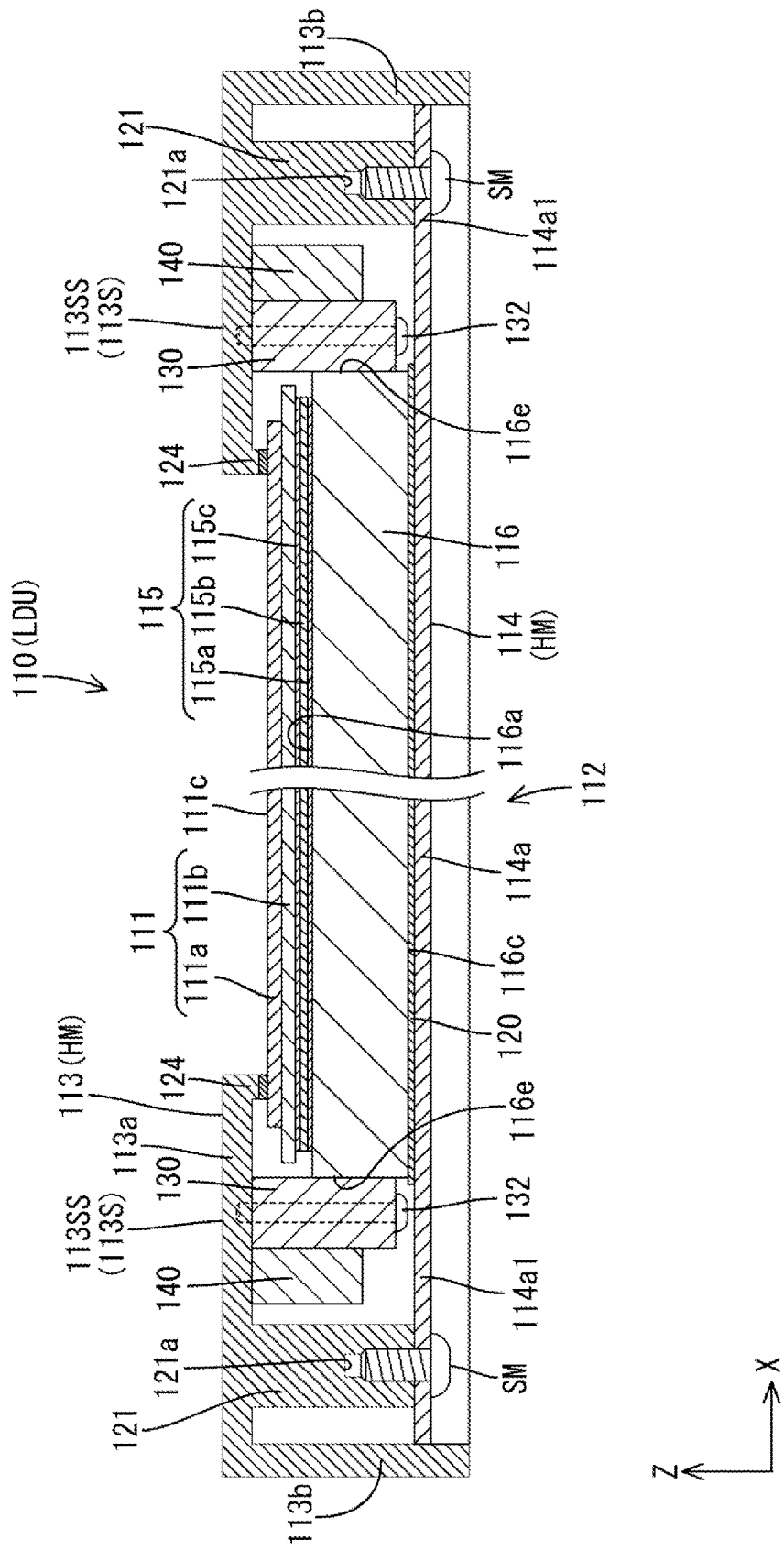
FIG. 12 is a cross-sectional view of a liquid crystal display device 110 according to a second embodiment taken in a long-side direction thereof along a line passing a positioning member 30.
Figure 13:
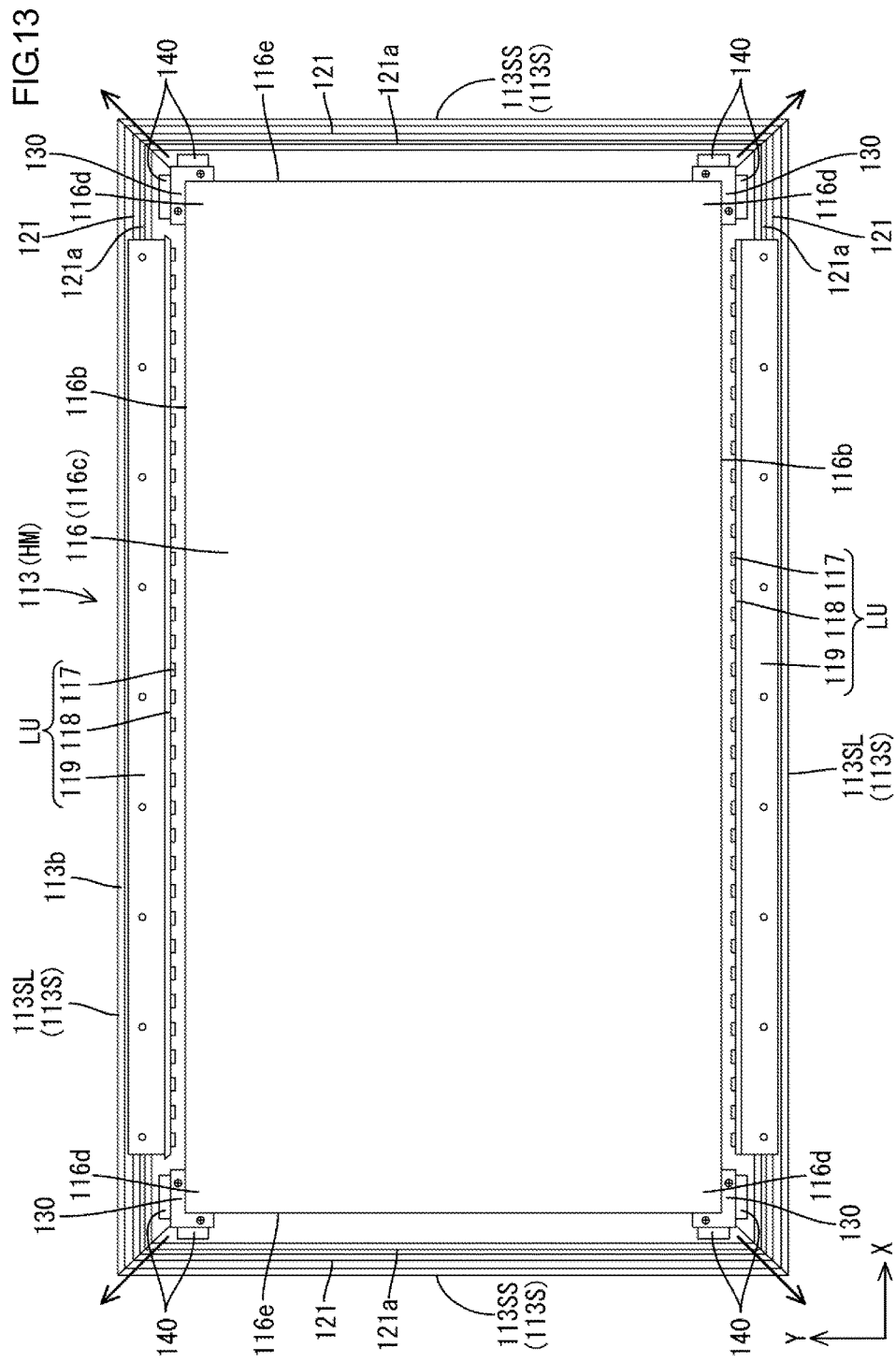
FIG. 13 is a rear view of a frame 113 including the positioning members 130, a light guide plate 116, and a LED unit LU.
Figure 14:
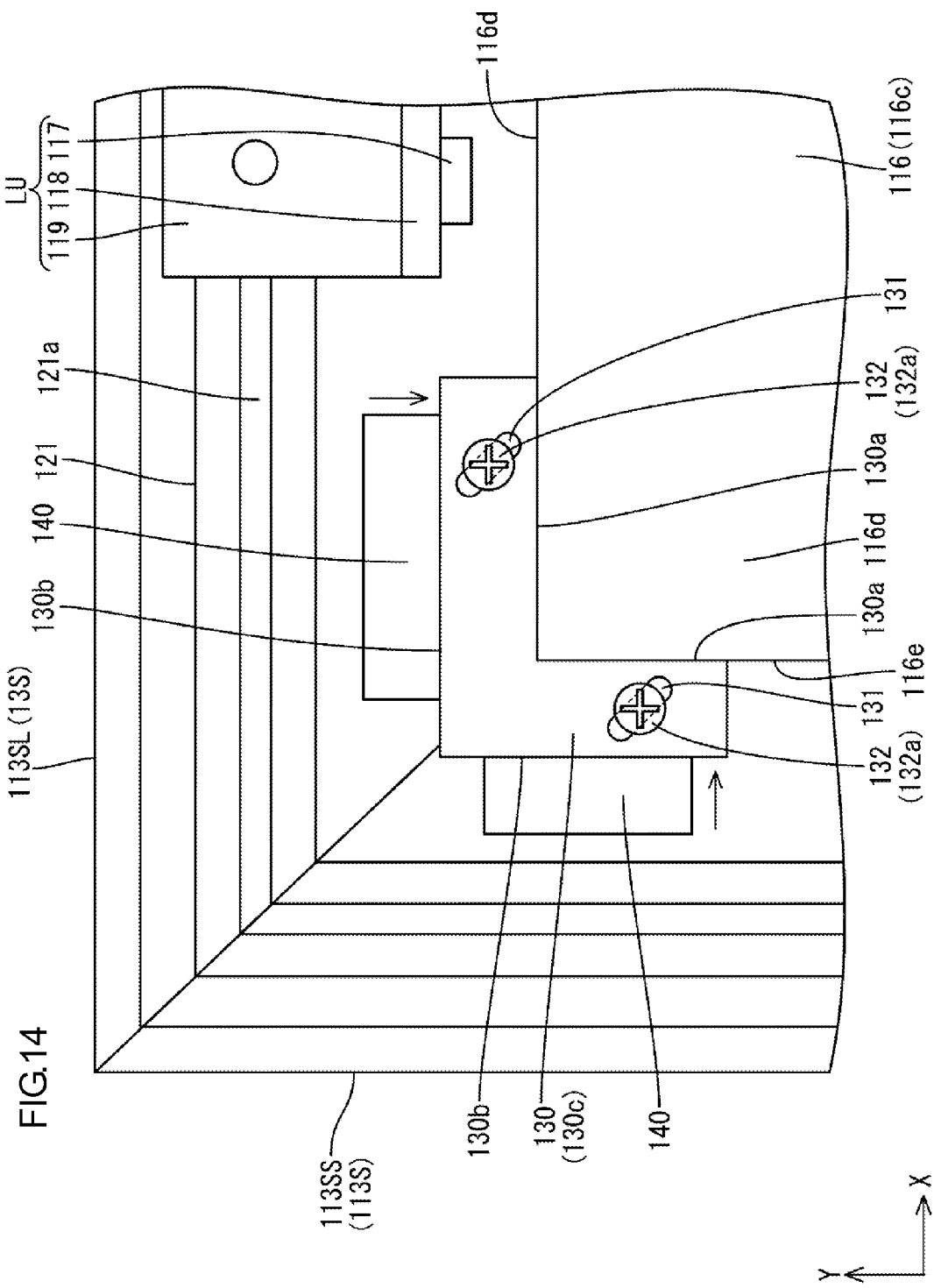
FIG. 14 is a magnified plan view of one of four corner portions of the light guide plate 116 in FIG. 13.

A second embodiment will be described with reference to drawings. In the second embodiment, unlike the first embodiment, an elastic member 140 is arranged on an outer side of a positioning member 130. Other configurations are similar to those in the first embodiment and therefore, configurations, functions, and effects will not be described. In FIGS. 12, 13 and 14, components represented by the numerals with 100 is added to the reference numerals in FIGS. 6, 9 and 10 are same as those in the first embodiment.

As illustrated in FIGS. 12 and 13, in a backlight unit 112 according to the second embodiment, block-shaped elastic members 140 that are made of a material softer than a material of the positioning members 130 are arranged on an outer side of the positioning members 130. Two elastic members 140 are arranged for each positioning member 130 and surfaces of the elastic members 140 facing the positioning member 130 are in contact with an outer surface 130b of each positioning member 130 (see FIG. 14). The two elastic members 140 arranged on the outer side of each positioning member 130 are fixed to a rear surface of a panel holding portion 113a of a frame 113 with an adhesive tape or adhesive to be attached to the frame 113. One of the two elastic members 140 is attached to a long-side frame piece 113SL and the another one is attached to a short-side frame piece 114SS. Each elastic member 140 is arranged slightly closer to a light guide plate 116 than the outer surface 130b of each positioning member 130 is. Accordingly, each positioning member 130 is pressed by the elastic members 140 toward the light guide plate 116 (in a direction represented by arrows in FIG. 14). The shape of through holes 131 in each positioning member 130 is same as that in the first embodiment and will not be described.

With the configuration of the present embodiment, if the light guide plate 116 thermally expands, edge surfaces of four corner portions 116d of the light guide plate 116 move away from a center of the light guide plate 116 (in directions represented by arrows in FIG. 13) similarly to the first embodiment. According to the movement, the positioning members 130 also move away from the center of the light guide plate 116. The elastic members 140 that are in contact with an outer surface of each positioning member 130 elastically deform according to the movement of each positioning member 130 and absorb the size increase of the light guide plate 116. Thereafter, if the light guide plate 116 thermally shrinks, the elastic members 140 elastically recover so that each positioning member 130 is pressed toward the center of the light guide plate 116 with being in contact with the light guide plate 116. Each positioning member 130 is pressed by the elastic members 140 toward the light guide plate 116. Therefore, even if the light guide plate 116 shrinks without occurrence of thermal expansion, each positioning member 130 is pressed toward the center of the light guide plate 116 with being in contact with the light guide plate 116. According to the present embodiment, the light guide plate 116 is positioned by the positioning members 130 even if the light guide plate 116 shrinks.

Third Embodiment

Figure 15:
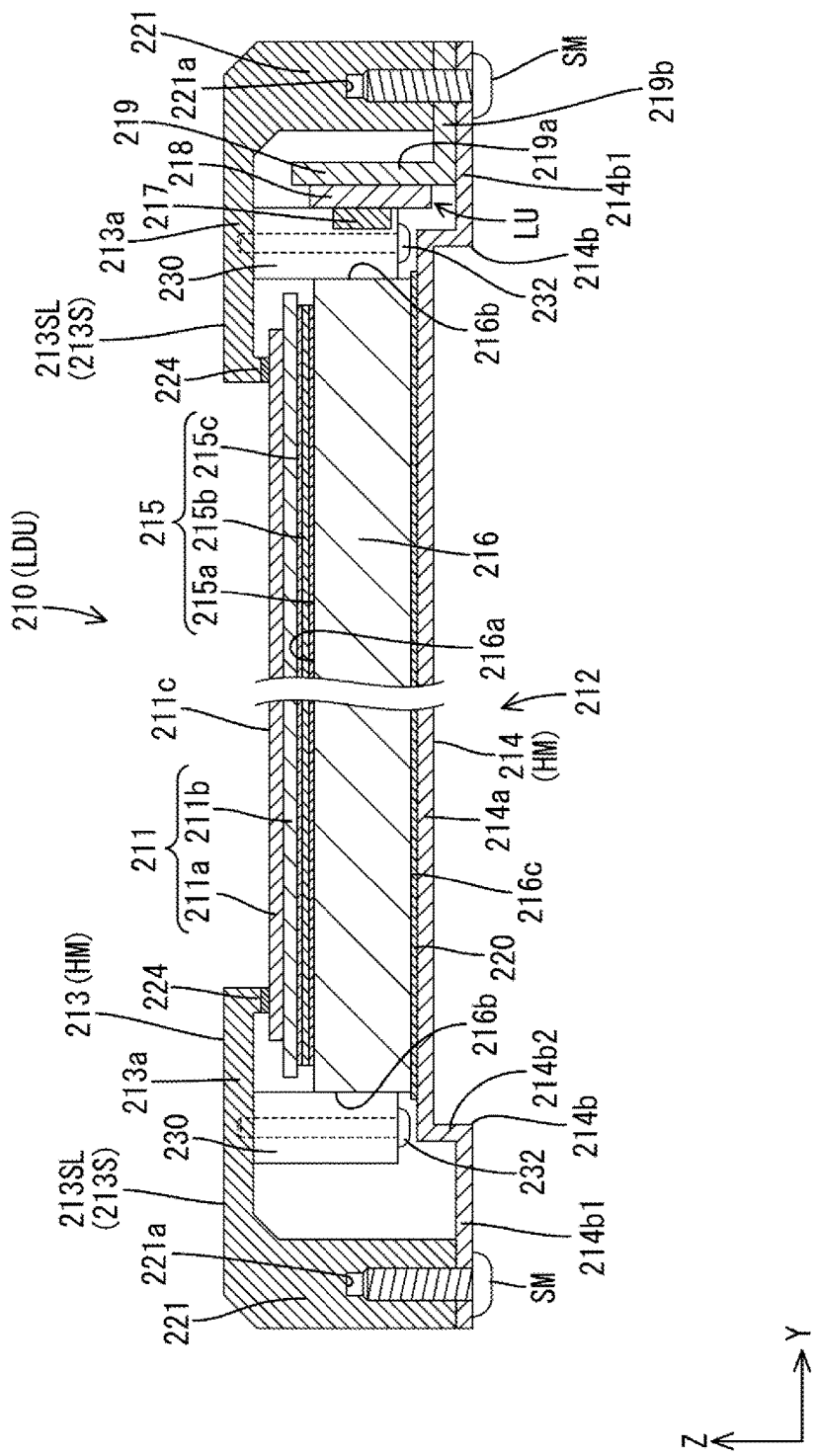
FIG. 15 is a cross-sectional view of a liquid crystal display device 210 according to a third embodiment taken in a long-side direction thereof along a line passing a positioning member 230.
Figure 16:
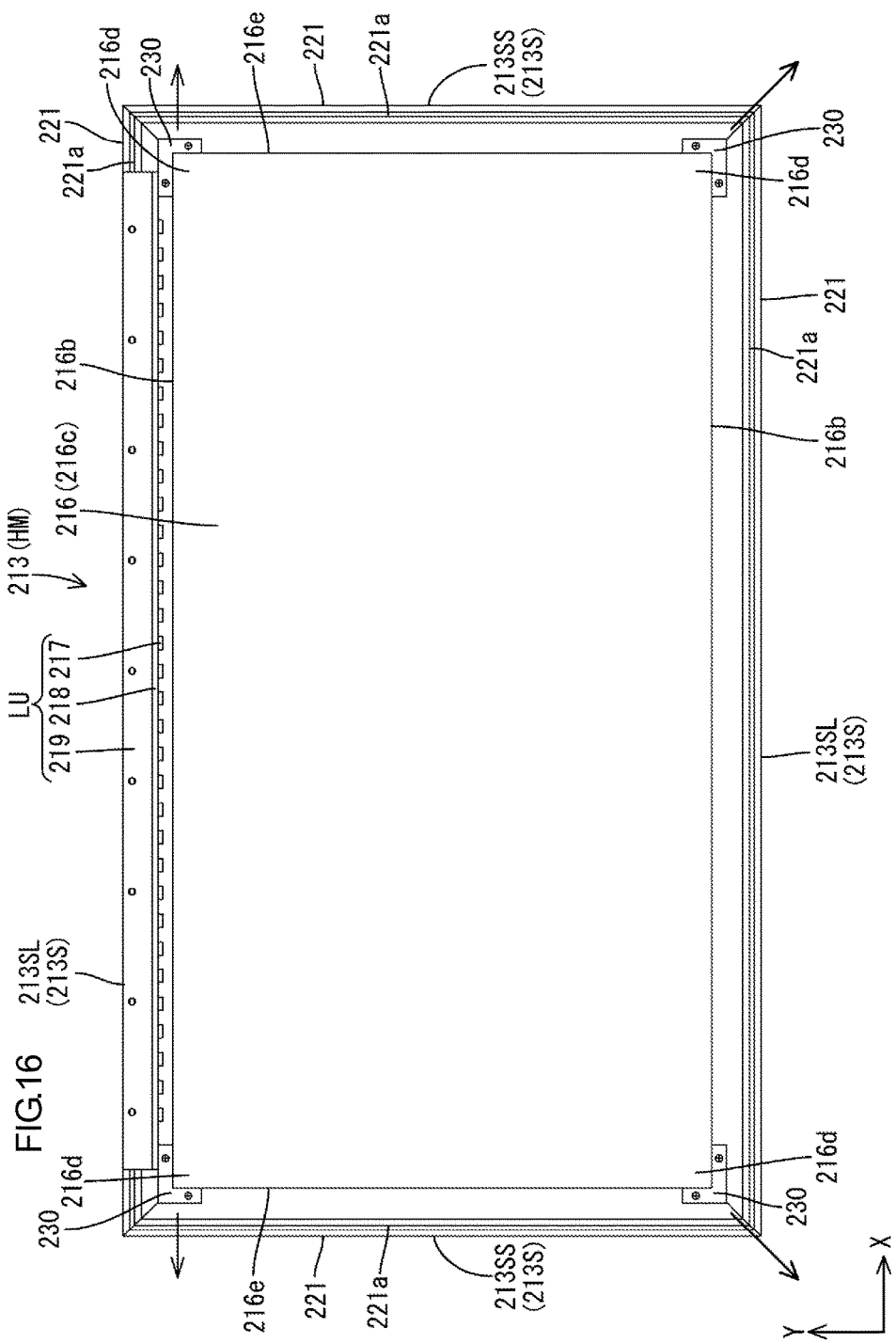
FIG. 16 is rear view of a frame 213 including the positioning members 230, a light guide plate 216, and a LED unit LU.
Figure 17:
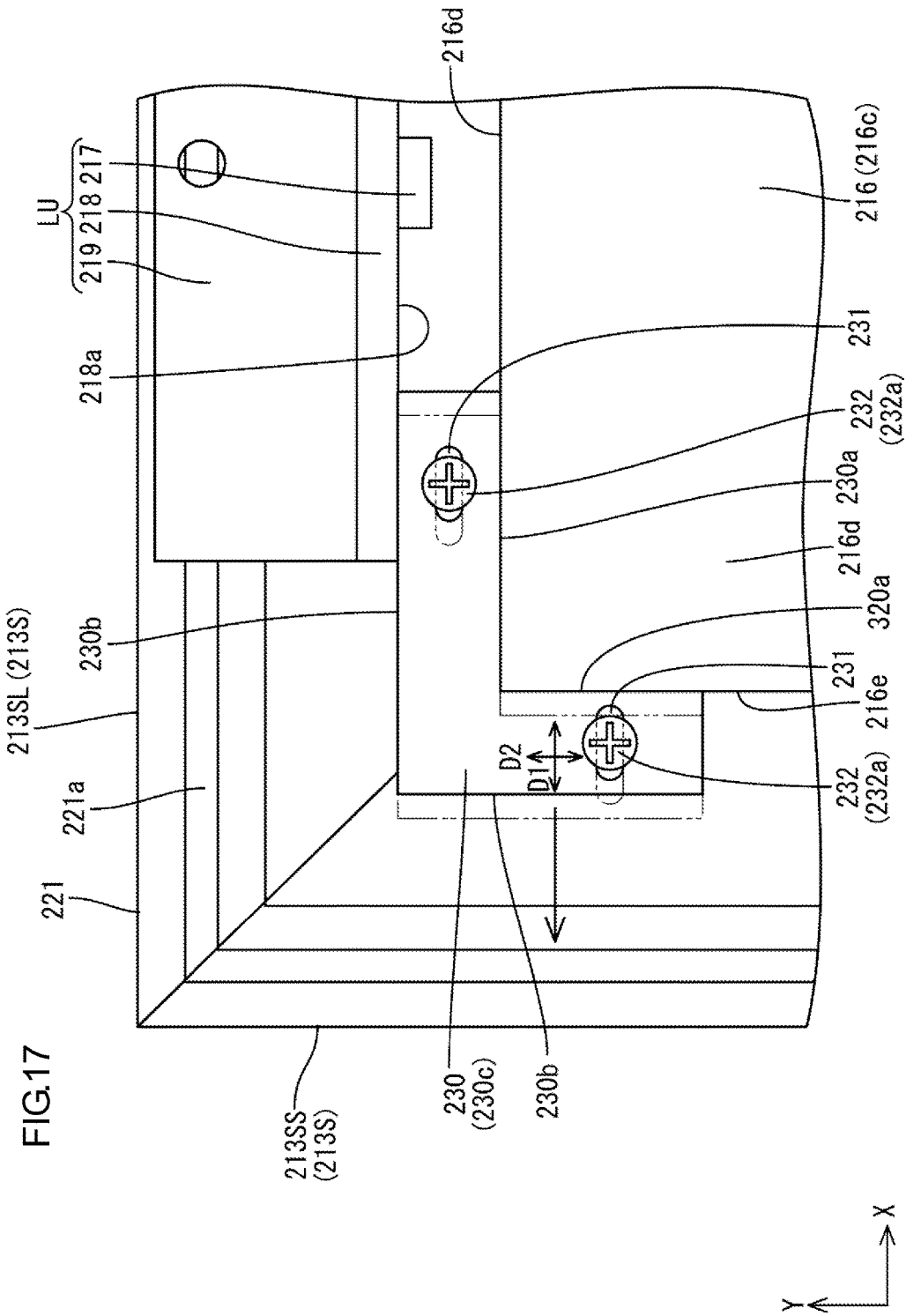
FIG. 17 is a magnified plan view of one of four corner portions of the light guide plate 216 in FIG. 16.

A third embodiment of this invention will be described with reference to drawings. In the third embodiment, a configuration of a frame 213 and arrangement of LED units LU differ from those in the first embodiment. Other configurations are similar to those in the first embodiment and therefore, configurations, functions, and effects will not be described. In FIGS. 15, 16 and 17, components represented by the numerals with 200 is added to the reference numerals in FIGS. 4, 9 and 10 are same as those in the first embodiment.

In a backlight unit 212 according to the third embodiment, a frame 213 does not include side walls unlike the first embodiment and the second embodiment. Outer surfaces of screw mounting portions 221 can be seen from an outer side (see FIG. 15). Namely, the screw mounting portions 221 have a function of the side walls. A chassis 214 does not include side walls on an outer side with respect to an LED holding portion 214b corresponding to the frame 213. In a liquid crystal display device 210 according to the third embodiment, a light guide plate 216 has long-side edge surfaces and only one of the long-side edge surfaces is a light entrance surface 126b. An LED unit LU is arranged to face the light entrance surface 216b. An LED board 218 included in the LED unit LU has a mount surface 218a where LEDs 217 are mounted and extends such that two end portions of the mount surface 218a in the long-side direction (the X-axis direction) are opposed to respective positioning members 230 arranged on two end portions of the light entrance surface 216b. The end portions of the mount surface 218a are in contact with outer surfaces 230b of the opposed positioning members 230, respectively.

According to the third embodiment, the positioning members 230 have through holes 231 and the positioning members 230 arranged on the two end portions of the light entrance surface 216b (the positioning members in contact with the two end portions of the LED board 218) have certain through holes 231 having a shape different from that of the first and second embodiments. Specifically, as illustrated in FIG. 17, the certain through holes 231 have an ellipsoidal plan view shape having a major axis direction D1 that is the long-side direction of the LED board 218 (an extending direction of the LED board 218, the X-axis direction) and having a short-axis direction D2 that is a direction perpendicular to the major axis direction D1 (the Y-axis direction). Accordingly, the positioning members 230 arranged on the two end portions of the light entrance surface 216b can slide in the long-side direction of the LED board 218 (the extending direction of the LED board 218, the X-axis direction) by a length of the major axis of the through holes 231. The through holes 231 arranged in other positioning members 230 have the shape same as that in the first and second embodiments.

According to the present embodiment, as described before, a part of the mount surface 218a of the LED board 218 is in contact with the outer surface 230b of the positioning member 230 so that the distance between the LED board 218 and the light entrance surface 216b of the light guide plate 216 is determined. Therefore, the distance between the LEDs 217 and the light entrance surface 216b is constant even if the light guide plate 216 thermally expands. The certain through holes 231 have the above-described shape and therefore, the positioning members 230 arranged on the two end portions of the light entrance surface 216b slide away from the light guide plate 216 in the long-side direction of the LED board 218 (the extending direction of the LED board 218) when the light guide plate 216 thermally expands. The direction in which the positioning members 230 slide is perpendicular to a direction in which the light entrance surface 216b moves toward the LEDs 217 (the Y-axis direction). Therefore, the light entrance surface 216b does not move closer to the LEDs 217 even if the positioning members 230 that are in contact with the LED board 218 slide in the long-side direction of the LED board 218. On edge surfaces of the light guide 216 having no LED unit LU, similarly to the first and second embodiments, the positioning members 230 move away from the center of the light guide plate 216 to absorb the movement of the edge surface of the light guide plate 216 due to the thermal expansion. According to the liquid crystal display device 210 of the present embodiment, the movement of the edge surface of the light guide plate 216 (the light entrance surface 216b) is absorbed and also the distance between the LEDs 217 and the light entrance surface 216b of the light guide plate 216 is kept constant on the side where the LED unit LU is arranged. As a result, the liquid crystal display device 210 has good optical properties.

In the present embodiment, the LED board 218 is in contact with the positioning members 230 so that the distance between the LEDs 217 and the light entrance surface 216b is determined without a spacer. Therefore, a cost for the components is reduced.

Fourth Embodiment

A fourth embodiment of this invention will be described with reference to drawings. In the fourth embodiment, a configuration of holding the LED unit LU differs from that in the first embodiment. Other configurations are similar to those in the first embodiment and the third embodiment and therefore, configurations, functions, and effects will not be described. In FIGS. 18, 19, 20 and 21, components represented by the numerals with 300 is added to the reference numerals in FIGS. 4, 6, 9 and 10 are same as those in the first embodiment and the third embodiment.

Figure 18:
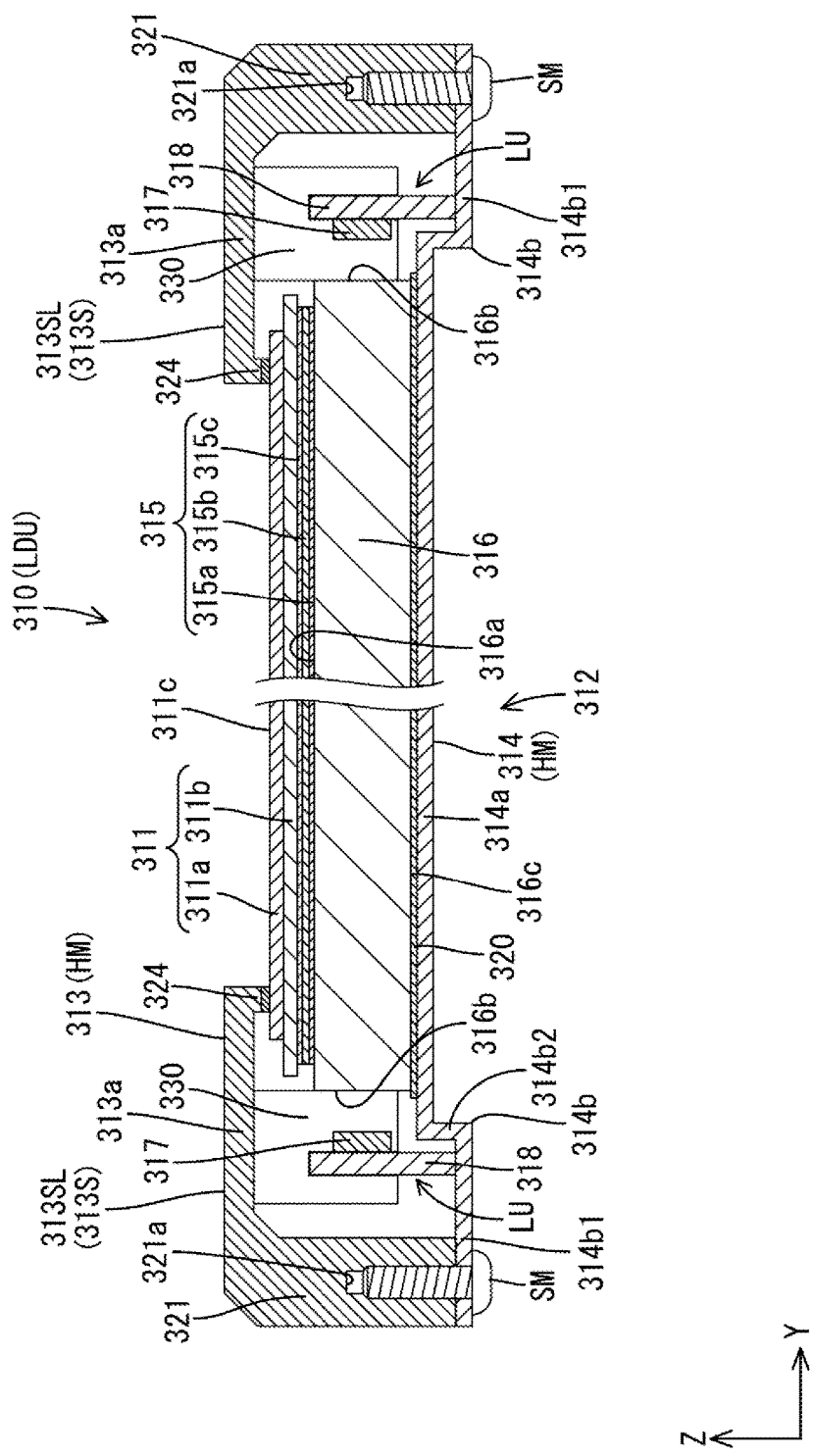
FIG. 18 is a cross-sectional view of a liquid crystal display device 310 taken in a short-side direction thereof according to a fourth embodiment.
Figure 19:
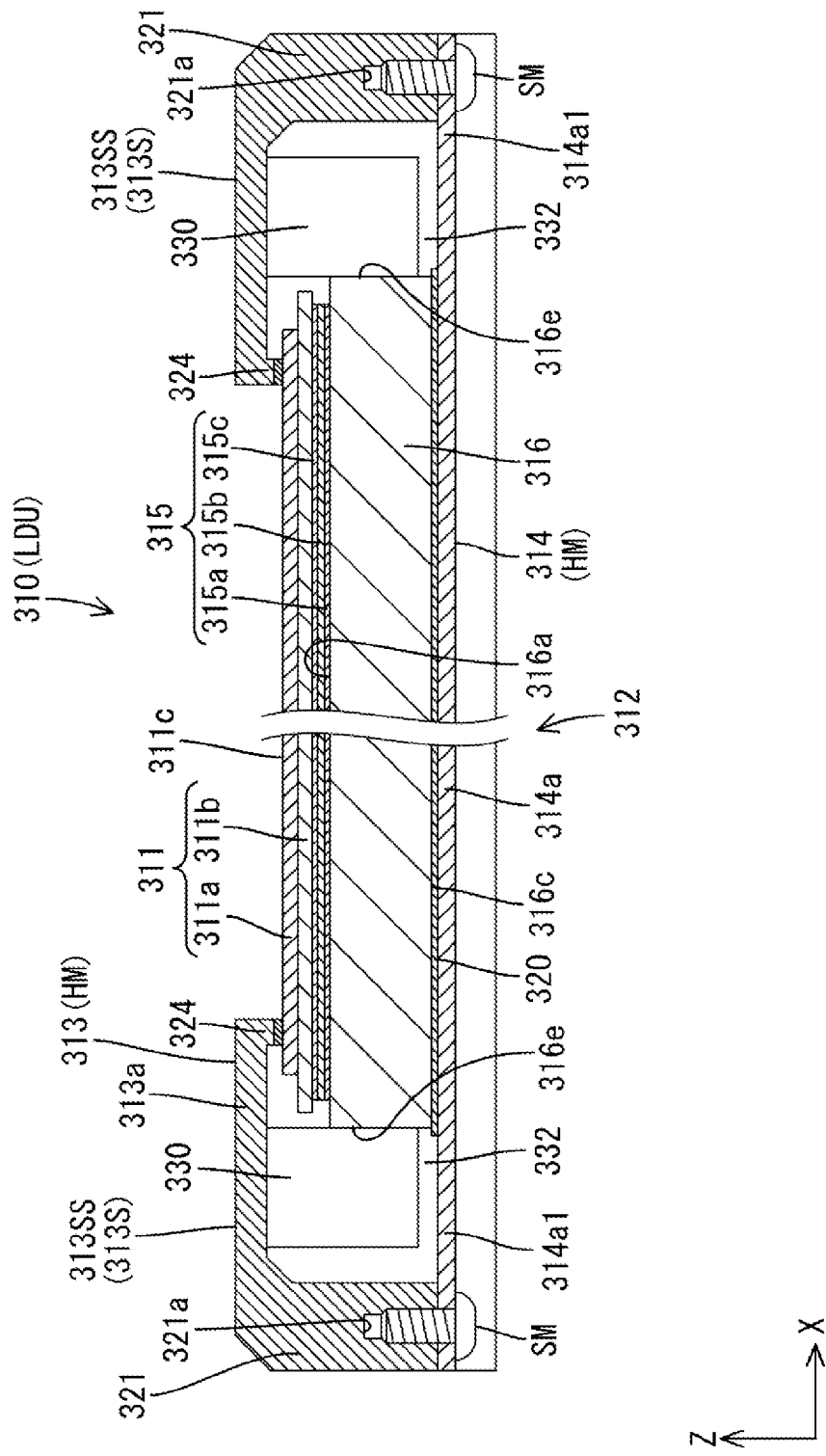
FIG. 19 is a cross-sectional view of the liquid crystal display device 310 taken in a long-side direction thereof according to the third embodiment.
Figure 20:
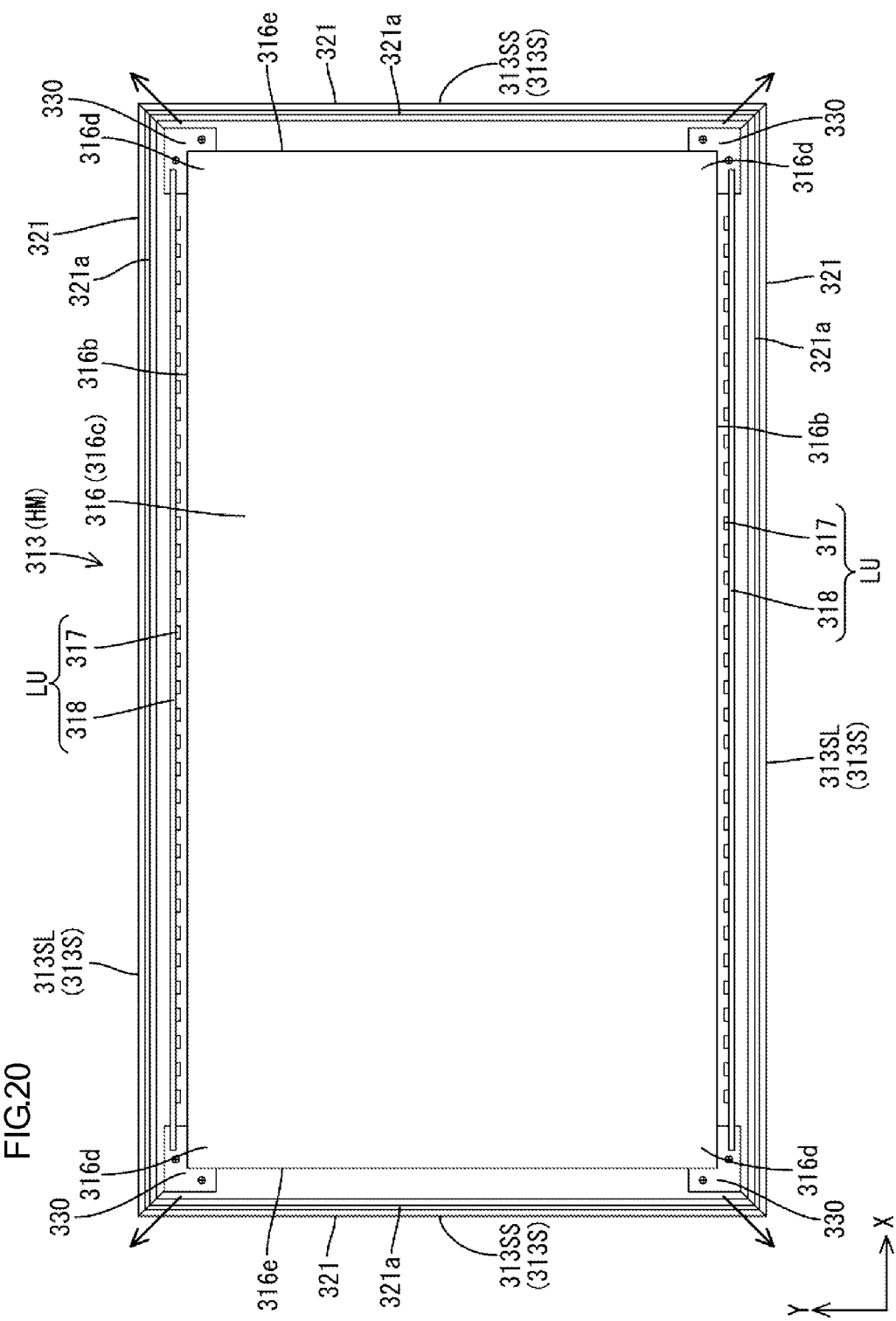
FIG. 20 is a rear view of a frame 313 including the positioning members 330, a light guide plate 316, and a LED unit LU.

In a backlight unit 312 according to the fourth embodiment, similarly to the third embodiment, outer surfaces of screw mounting portions 321 can be seen from an outer side and the screw mounting portions 321 have a function as the side walls (see FIGS. 18 and 19). According to the fourth embodiment, a liquid crystal display device 310 does not include a heat dissipation member and an LED unit LU includes an LED board 318 and LEDs 317. The LED units LU are arranged on two long-side edge surfaces of a light guide plate 316 similarly to the first and second embodiments. Further, according to the fourth embodiment, positioning members 330 are arranged at four corner portions 316d of the light guide plate 316 and each of the positioning members 330 has a width in a plane-surface direction (an X-Y plane-surface direction) greater than that in the first and third embodiments. LED boards 318 are arranged corresponding to the respective long-side edge surfaces of the light guide plate 316. Two end portions of each LED board 318 in the long-side direction (extending direction of the LED board 318, the X-axis direction) overlap the respective positioning members 330 arranged on two end portions of a light entrance surface 316b in a plan view. The two end portions of each LED board 318 are held by the respective positioning members 330.

Specifically, each of the positioning members 330 includes a groove 330s in a portion facing a corresponding one of the two end portions of the LED board 318 in the long side direction (the extending direction of the LED board 318, the X-axis direction). The groove 330s is open toward the LED board 318 and extends in a thickness direction (a Z-axis direction) of the light guide plate 316. Two end portions of the LED board 318 in the long-side direction (the extending direction of the LED board 318, the X-axis direction) are held with the groove 330s with respect to a plate thickness direction of the LED board 318 (the Y-axis direction). Therefore, the LED board 318 is configured to stand up on a bottom plate portion 314a of a chassis 314 without a heat dissipation member (see FIG. 8). A small clearance is provided between the groove 330s in the positioning member 330 and the end portion of the LED board 318. Accordingly, each LED board 318 is held by the positioning member 330 so as to be less likely to move closer to the light entrance surface 316b and away from the light entrance surface 316b, that is, less likely to move in the Y-axis direction and allowed to move in the extending direction of the LED board 318, that is, in the X-axis direction.

According to the present embodiment, the two end portions of the LED board 318 in the long-side direction (the extending direction of the LED board 318, the X-axis direction) are held by the respective positioning members 330 to determine the distance between the LED board 318 and the light entrance surface 316b of the light guide plate 316. Even if the light guide plate 316 thermally expands and the positioning members 330 move away from the center of the light guide plate 316, the LED boards 318 held by the respective positioning members 330 move together with the positioning members 330 and the LED boards 318 also move by the same distance as the movement distance of the light entrance surface 316b. Namely, the end portions of the LED board 318 in the extending direction thereof are away from the bottom surfaces of the grooves 330s according to sliding of the positioning members 330. Accordingly, the position of the LED board 318 in the X-axis direction is maintained and the LED board 318 moves in the Y-axis direction by the same distance as the movement distance of the light entrance surface 316b caused by the sliding of the positioning members 330. Accordingly, the distance between the LEDs 317 and the light entrance surface 316b is constant and the liquid crystal display device 310 has good optical properties.

According to the present embodiment, the positioning member 330 holds the LED board 318 without any holding members. Further, the liquid crystal display device 310 does not include a heat dissipation member. Therefore, a cost for the components is reduced.

Modifications of the above embodiments will be described below.

(1) In each of the above embodiments, each positioning member has ellipsoidal through holes and is held with the frame and fixed to the frame with screws. A configuration in which each positioning member at least slides away from the light guide plate is not limited to those in the above embodiments. In the configuration that the positioning member is fixed with screws, the number, the arrangement, and the shape of the through holes are not limited to those in the above embodiments.

(2) In each of the above embodiments, each positioning member has a plan view L-shape. However, the shape of the positioning members is not limited thereto.

(3) In the second embodiment, two elastic members are arranged on each of the positioning members. However, the number and the arrangement of the elastic members are not limited thereto.

(4) In the third embodiment, the two end portions of the LED board in the long-side direction (the extending direction) are in contact with the positioning members to determine the distance between the LEDs and the light entrance surface. However, the configuration for determining the distance between the LEDs and the light entrance surface is not limited thereto.

(5) In the fourth embodiment, the two end portions of the LED board in the long-side direction (the extending direction) are held by the respective grooves formed in the positioning members to hold the LED board. However, the configuration for holding the LED board is not limited thereto.

(6) Other than each of the above embodiments, the configuration, the number, and the arrangement of the positioning members may be changed as appropriate.

(7) In each of the above embodiments, the liquid crystal display device does not include a cabinet. However, the liquid crystal display device may include a cabinet.

(8) In each of the above embodiments, the liquid crystal display device including the liquid crystal panel as a display panel is used. However, the technology can be applied to display devices including other types of display panels.

The embodiments of the present invention have been described in detail. However, the present invention is not limited to the embodiments described in the above description. The scope of the present invention includes various modifications of the above embodiments.

The technical elements described or shown in the specification or drawings exhibit the technical usefulness individually or in various combination thereof. Furthermore, the technologies illustrated in the specification or drawings realize a plurality of purposes at the same time and have a technical usefulness when one of the purposes is realized.

EXPLANATION OF SYMBOLS

TV: television receiver, LDU: liquid crystal display unit, PWB: poser board, MB: main board, CTB: control board, CV: cover, ST: stand, LU: LED unit, 10, 110, 210, 310: liquid crystal display device, 11, 111, 211, 311: liquid crystal panel, 12, 112, 212, 312: backlight unit, 13, 113, 213, 313: frame, 14, 114, 214, 314: chassis, 15, 115, 215, 315: optical member, 16, 116, 216, 316: light guide plate, 16a, 116a, 216a, 316a: light exit surface, 16b, 116b, 216b, 316b: light entrance surface, 16c, 116c, 216c, 316c: corner portions (of the light guide plate), 17, 117, 217, 317: LED, 18, 118, 218, 318: LED board, 20, 120, 220, 320: reflection sheet, 30, 130, 230, 330: positioning member, 30a, 130a, 230a, 330a: inner surface (of the positioning member)

The invention claimed is:

1. A lighting device, comprising:
a light guide plate including an edge surface as a light entrance surface and a plate surface as a light exit surface;
a light source that is opposed to the light entrance surface of the light guide plate and in a portion of the light guide plate except for four corner portions of the light guide plate;
a chassis arranged on an opposite side of the light guide plate from the light exit surface;
a frame arranged on a light exit surface side of the light guide plate wherein the light guide plate and the light source are between the frame and the chassis;
a light source board having a mount surface where the light source is mounted and extending along the light entrance surface with the mount surface being opposed to the light entrance surface; and
positioning members arranged on an inner surface of the frame that are opposed to the respective four corner portions of the light guide plate, each of the positioning members being in contact with a long-side edge surface and a short-side edge surface of the light guide plate at a corresponding one of the four corner portions so as to position the light guide plate in a plate surface direction, wherein
at least two of the positioning members are configured to slide away from the light guide plate along the inner surface of the frame,
the light source board is arranged on only one edge surface side of the light guide plate, and
the light source board has two end portions in an extending direction thereof and the mount surface at each of the two end portions is in contact with an opposite surface of the positioning members from a surface that is in contact with the light guide plate.

2. The lighting device according to claim 1, wherein
each positioning member includes a through hole that is therethrough in a direction perpendicular to the light exit surface of the light guide plate and has an ellipsoidal plan view shape having a major axis along a direction extending away from the light guide plate, and
the lighting device further comprises screw members each including a screw shaft portion and a screw head portion, the screw shaft portion having an outer diameter smaller than a short axis of the through hole and being inserted through the through hole, and the screw head portion having an outer diameter greater than the short axis of the through hole and sandwiching the positioning member with the inner surface of the frame so that a distal end of the screw shaft portion is fixed to the inner surface of the frame.

3. The lighting device according to claim 1, wherein
the frame includes frame pieces for each side thereof, and
each of the positioning members is arranged to extend across end portions of adjacent two frame pieces to connect the adjacent two frame pieces.

4. The lighting device according to claim 3, wherein
each positioning member includes at least two through holes that are therethrough in a direction perpendicular to the light exit surface of the light guide plate and each through hole has an ellipsoidal plan view shape having a major axis along a direction extending away from the light guide plate, and
the lighting device further comprises screw members each including a screw shaft portion and a screw head portion, the screw shaft portion having an outer diameter smaller than a short axis of the through hole and inserted through each of the at least two through holes, and the screw head portion having an outer diameter greater than the short axis of the through hole and sandwiching the positioning member with inner surfaces of the two frame pieces so that a distal end of each screw shaft portion is fixed to the inner surfaces of the two adjacent frame pieces.

5. The lighting device according to claim 1, wherein
the positioning members are configured to slide toward a center of the light guide plate, and
the lighting device further comprising elastic members arranged on an opposite side of the respective positioning members from the light guide plate to be in contact with the positioning members and fixed to the inner surface of the frame, and the elastic members being softer than the positioning members.

6. The lighting device according to claim 5, wherein
the elastic members are fixed to the inner surface of the frame with pressing the positioning members toward the light guide plate.

7. The lighting device according to claim 1, wherein the positioning members that are in contact with the mount surface of the light source board are configured to slide only in the extending direction of the light source board.

8. A display device comprising:
a display panel configured to provide a display using light from the lighting device according to claim 1.

9. The display device according to claim 8, wherein the display panel is a liquid crystal display panel including liquid crystals.

10. The display device according to claim 8, further comprising an optical member sandwiched between the display panel and the light guide plate, wherein
the display panel, the optical member, and the light guide plate that are overlaid with each other are held between the frame and the chassis,
the frame includes a screw mounting portion projecting from an inner surface thereof toward the chassis, and
the chassis includes a screw fitting portion where a screw member to be mounted on the screw mounting portion is fitted from an opposite side from the frame.

11. A television device comprising the display device according to claim 8.

12. The lighting device according to claim 1, wherein all of the positioning members are configured to slide away from the light guide plate along the inner surface of the frame.

* * * * *